US010661781B2

(12) United States Patent
Sugiyama et al.

(10) Patent No.: US 10,661,781 B2
(45) Date of Patent: May 26, 2020

(54) VEHICLE CONTROL APPARATUS

(71) Applicant: TOYOTA JIDOSHA KABUSHIKI KAISHA, Toyota-shi, Aichi (JP)

(72) Inventors: Koji Sugiyama, Toyota (JP); Shinichi Sasade, Toyota (JP); Kazuyuki Shiiba, Miyoshi (JP); Tooru Matsubara, Toyota (JP); Masato Yoshikawa, Toyota (JP); Takahiro Kimura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 16/046,363

(22) Filed: Jul. 26, 2018

(65) Prior Publication Data

US 2019/0061734 A1 Feb. 28, 2019

(30) Foreign Application Priority Data

Aug. 25, 2017 (JP) .................................. 2017-162816

(51) Int. Cl.
*B60W 10/10* (2012.01)
*B60W 30/192* (2012.01)
(Continued)

(52) U.S. Cl.
CPC ............ *B60W 20/15* (2016.01); *B60W 10/06* (2013.01); *B60W 10/08* (2013.01); *B60W 10/115* (2013.01); *B60W 30/19* (2013.01); *B60K 6/365* (2013.01); *B60K 6/445* (2013.01); *B60K 6/547* (2013.01); *B60W 2510/1005* (2013.01); *B60W 2530/12* (2013.01); *B60W 2540/10* (2013.01);
(Continued)

(58) Field of Classification Search
CPC .... B60W 10/10; B60W 30/192; F02D 41/024
See application file for complete search history.

(56) References Cited

U.S. PATENT DOCUMENTS 6,248,040 B1 * 6/2001 Minowa ................ F02D 41/024
477/98
7,150,333 B2 * 12/2006 Noda ..................... B60K 6/485
180/65.26
(Continued)

FOREIGN PATENT DOCUMENTS

JP 2000240775 A * 9/2000 ............. F16H 61/00
JP 2015-113932 A 6/2015

*Primary Examiner* — Tisha D Lewis
(74) *Attorney, Agent, or Firm* — Oliff PLC

(57) ABSTRACT

A vehicle control apparatus includes: a state determining portion configured to determine whether an engine is in a first operational state corresponding to a normal operation state or a second operational state corresponding to an engine stop state in which the engine is stopped and/or a catalyst warming-up state in which the engine is operated to warm up a catalyst; and a shift control portion configured, in process of a shifting action of a transmission mechanism, to control at least an engaging pressure of an engaging coupling device as one of a plurality of coupling devices of the transmission mechanism, which is to be placed in an engaged state upon completion of the shifting action, such that the engaging pressure of the engaging coupling device is controlled to be lower when the engine is in the second operational state, than when the engine is in the first operational state.

16 Claims, 8 Drawing Sheets

(51) Int. Cl.
    *F02D 41/02*     (2006.01)
    *B60W 20/15*     (2016.01)
    *B60W 10/08*     (2006.01)
    *B60W 10/115*     (2012.01)
    *B60W 30/19*     (2012.01)
    *B60W 10/06*     (2006.01)
    *B60K 6/445*     (2007.10)
    *B60K 6/547*     (2007.10)
    *B60K 6/365*     (2007.10)

(52) U.S. Cl.
    CPC ............... *B60W 2710/0644* (2013.01); *B60W 2710/0666* (2013.01); *B60W 2710/083* (2013.01); *B60W 2710/1022* (2013.01); *B60W 2710/1083* (2013.01); *B60Y 2200/92* (2013.01)

(56) References Cited

U.S. PATENT DOCUMENTS

| | | | |
|---|---|---|---|
| 2002/0046732 A1* | 4/2002 | Katou .................. | B60W 10/06 |
| | | | 123/339.24 |
| 2015/0126331 A1* | 5/2015 | Scheffler ............. | F02D 41/0205 |
| | | | 477/109 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-162816 filed on Aug. 25, 2017, the disclosure of which is herein incorporated by reference in its entirety.

FIELD OF THE INVENTION

The present invention relates to a control apparatus for a vehicle including a drive power source (such as engine and motor/generator) and a mechanically-operated transmission mechanism that is configured to transmit a drive force of the drive power source.

BACKGROUND OF THE INVENTION

There is known a control apparatus for a vehicle that includes (i) an engine serving as a drive power source, (ii) a motor/generator serving as the drive power source and (iii) a mechanically-operated transmission mechanism which constitutes a part of a power transmitting path between the drive power source and drive wheels of the vehicle and which is placed in a selected one of a plurality of gear positions with engagement of a selected one or ones of a plurality of coupling devices. A control apparatus for an automatic transmission, which is disclosed in JP-2015-113932A, is an example of this type of control apparatus. This document discloses that, upon so-called "clutch-to-clutch" shifting operation of the automatic transmission (corresponding to the above-described mechanically-operated transmission mechanism), an output parameter value (e.g., an estimated value of a transmitted torque that is transmitted through a clutch of the automatic transmission) is calculated, by using a mathematical model, for reducing a shock and an unsatisfactory acceleration feeling given to a vehicle operator.

SUMMARY OF THE INVENTION

By the way, a vehicle, which is equipped with the drive power source in the form of an engine and a motor/generator, is capable of running by at least a drive force of the engine in a state in which at least the engine is operated, running by a drive force of the motor/generator in a state in which the engine is stopped, and running in a state in which the engine is operated exclusively for warming up a catalyst. If a crank angle is displaced during stop of the engine, a shock could be caused or increased when the engine is restarted. Further, during warming-up of the catalyst, if the engine rotating speed is lowered from a target value suitable for facilitating the catalyst warming-up, the warming-up would not be performed suitably whereby emissions (gas exhausted from the engine) could be worse. Therefore, in process of a shifting action of the mechanically-operated transmission mechanism executed when the engine is stopped or operated to warm up the catalyst, it is preferable to accurately control the engine rotating speed so as not to allow the engine rotating speed to be deviated from the target value. On the other hand, it is considered that there is a higher need for the drive force (in other words, unsatisfactory acceleration feeling is more likely to be given to a vehicle operator) when the vehicle is running by the drive force of the engine, than when the vehicle is running by only the drive force of the motor/generator. Therefore, in process of a shifting action of the mechanically-operated transmission mechanism executed when the engine is operated without purpose of warming up the catalyst, it is preferable to improve drivability such as reduction of time required for completing the shifting action.

The present invention was made in view of the background art described above. It is therefore an object of the present invention to provide a control apparatus for a vehicle, which is capable of improving accuracy of control of a rotating speed of an engine and also improving drivability of the vehicle, depending on an operational state of the engine.

The object indicated above is achieved according to the following modes of the present invention.

According to a first mode of the invention, there is provided a control apparatus for a vehicle that includes (i) an engine serving as a drive power source, (ii) a motor/generator serving as the drive power source, and (iii) a mechanically-operated transmission mechanism which constitutes a part of a power transmitting path between the drive power source and drive wheels of the vehicle and which is placed in a selected one of a plurality of gear positions with engagement of a selected one or ones of a plurality of coupling devices included in the mechanically-operated transmission mechanism, wherein the engine is provided with a catalyst. The control apparatus includes: (a) a torque control portion configured, when a shifting action of the mechanically-operated transmission mechanism is executed, to control an input torque inputted to the mechanically-operated transmission mechanism, on the basis of a transmitted torque transmitted through the mechanically-operated transmission mechanism, such that a value representing a rotational state of the engine coincides with a target value; (b) a state determining portion configured to determine whether the engine is in a first operational state or a second operational state, wherein the first operational state corresponds to a normal operation state in which the engine is operated without purpose of warming up the catalyst, and the second operational state corresponds to an engine stop state in which the engine is stopped and/or a catalyst warming-up state in which the engine is operated to warm up the catalyst; and (c) a shift control portion configured, in process of the shifting action, to control at least an engaging pressure of an engaging coupling device as one of the plurality of coupling devices which is to be placed in an engaged state upon completion of the shilling action, such that the engaging pressure of the engaging coupling device is controlled to be lower when it is determined by the state determining portion that the engine is in the second operational state, than when it is determined by the state determining portion that the engine is in the first operational state. For example, in an arrangement in which the second operational state corresponds to at least the engine stop state, namely, at least the engine stop state is regarded as the second operational state, the engine is operated with a temperature of the catalyst being not lower than a predetermined value when the engine is in the first operational state that corresponds to the normal operation state. Further, in another arrangement in which the second operational state corresponds to at least the catalyst warming-up state, namely, at least the catalyst warming-up state is regarded as the second operational state, the engine is operated with the temperature of the catalyst being not lower than the predetermined value when the engine is in the first operational state that corresponds to the normal operation state, and the engine is operated with the temperature of the catalyst being lower than the predetermined value when the engine is in the second operational state.

According to a second aspect of the invention, in the control apparatus according to the first mode of the invention, the shift control portion is configured, when the engine is in the first operational state, to increase the engaging pressure of the engaging coupling device and then temporarily reduce the engaging pressure of the engaging coupling device before the completion of the shifting action.

According to a third aspect of the invention, in the control apparatus according to the first or second mode of the invention, the torque control portion is configured, when the engine is in the second operational state, to set the target value of the value representing the rotational state of the engine, to a value that causes a rotating speed of the engine to be held at a substantially constant value in the process of the shifting action.

According to a fourth aspect of the invention, in the control apparatus according to the third aspect of the invention, the torque control portion is configured, when the engine is in the second operational state, to compensate the target value of the value representing the rotational state of the engine, such that the rotating speed of the engine is not made lower than the substantially constant value in the process of the shifting action.

According to a fifth aspect of the invention, in the control apparatus according to any one of the first through fourth aspects of the invention, the shifting action of the mechanically-operated transmission mechanism is a power-on shift-up action that is a shift-up action to be executed with an acceleration operation member of the vehicle being placed in an operated position.

According to a sixth aspect of the invention, in the control apparatus according to any one of the first through fifth aspects of the invention, the vehicle includes an electrically-controlled transmission mechanism including a differential mechanism to which the engine is connected in a power transmittable manner, and a first motor/generator connected to the differential mechanism in a power transmittable manner, such that a differential state of the differential mechanism is controlled with an operating state of the first motor/generator being controlled, the motor/generator serving as the drive power source is a second motor/generator that is connected to an output rotary member of the electrically-controlled transmission mechanism in a power transmittable manner, and the torque control portion is configured, when the shifting action of the mechanically-operated transmission mechanism is executed, to control an output torque of the first motor/generator and an output torque of the second motor/generator, on the basis of an output torque of the engine and the transmitted torque transmitted through the mechanically-operated transmission mechanism, such that a value representing a rotational state of an input rotary member of the mechanically-operated transmission mechanism and the value representing the rotational state of the engine coincides with respective target values.

According to the first mode of the invention, the engaging pressure of the engaging coupling device, which is to be placed in the engaged state upon completion of the shifting action, is controlled in process of the shifting action, such that the engaging pressure of the engaging coupling device is controlled to be lower when the engine is in the second operational state, than when the engine is in the first operational state, so that the engine rotating speed is less likely to be deviated from the target value. That is, even if the engaging pressure varies in terms of the responsiveness or followability due to individual variation of the mechanically-operated transmission mechanism, the engine rotating speed is less likely to be deviated from the target value in the process of a shifting action of the mechanically-operated transmission mechanism, without much influence by the individual variation, owing to the arrangement in which the shifting action is progressed with the engaging pressure of the engaging coupling device being controlled to be relatively low. Thus, the engine rotating speed can be accurately controlled in the process of the shifting action of the mechanically-operated transmission mechanism when the engine is in the second operational state that corresponds to the engine stop state and/or the catalyst warming-up state. Therefore, it is possible to reduce shock upon restart of the engine, and/or to cause the catalyst warming-up to be adequately performed. Further, the shifting action can be quickly progressed with the engaging pressure of the engaging coupling device being controlled to be relatively high. Thus, it is possible to reduce the time required to complete the shifting action in the process of the shifting action of the mechanically-operated transmission mechanism when the engine is in the first operational state corresponding to the normal operation state. Therefore, the accuracy of control of the engine rotating speed and the drivability can be both improved, depending on the operational state of the engine.

According to the second mode of the invention, when the engine is in the first operational state corresponding to the normal operation state, the engaging pressure of the engaging coupling device, which has been increased, is temporarily reduced before the completion of the shifting action. Thus, although the engaging pressure of the engaging coupling device is controlled to be relatively high when the engine is in the normal operation state, the engaging shock can be alleviated by the temporal reduction of the engaging pressure.

According to the third mode of the invention, when the engine is in the second operational state, the target value of the value representing the rotational state of the engine is set to a value that causes the rotating speed of the engine to be held at a substantially constant value in the process of the shifting action. With the engine rotating speed being held at a substantially constant value, it is possible to reduce shock upon restart of the engine, and/or to cause the catalyst warming-up to be adequately performed.

According to the fourth mode of the invention, when the engine is in the second operational state, the target value of the value representing the rotational state of the engine is compensated such that the rotating speed of the engine is not made lower than the substantially constant value in the process of the shifting action, so that, even if the engine rotating speed is fluctuated, the engine rotating speed is not made lower than the target value. Thus, when the engine is stopped, the engine is avoided from being rotated in a negative direction. Further, when the engine is operated to warm up the catalyst, the catalyst warming-up can be adequately continued.

According to the fifth mode of the invention, when the power-on shift-up action of the mechanically-operated transmission mechanism is executed, it is possible to improve accuracy of control of the engine rotating speed and also improve drivability of the vehicle, depending on an operational state of the engine. That is, the above-described first mode of the invention is useful, particularly, upon execution of the power-on shift-up action of the mechanically-operated transmission mechanism in which an initiative coupling device (i.e., one of the coupling devices that causes the shifting action to be progressed) is the engaging coupling device and in which it is considered that there is a higher need for the drive force (in other words, unsatisfactory acceleration feeling is more likely to be given to a vehicle operator) when the vehicle is in the first operational state corresponding to the normal operation state.

According to the sixth mode of the invention, in the control apparatus for the vehicle equipped with the electrically-controlled transmission mechanism and the mechanically-operated transmission mechanism that are arranged in a series, when the shifting action of the mechanically-operated transmission mechanism is executed, it is possible to improve accuracy of control of the engine rotating speed and also improve drivability of the vehicle, depending on the operational state of the engine.

DETAILED DESCRIPTION OF PREFERRED EMBODIMENTS

In the following description of embodiments of the invention, a rotational state of each of rotating devices (e.g., an engine, a motor/generator, a first motor/generator, a second motor/generator, rotary elements of a differential mechanism, an output rotary member of an electrically-controlled transmission mechanism, rotary elements of a step-variable transmission) is represented by, for example, a rotating speed $\omega$ and an angular acceleration $d\omega/dt$ of the rotating device. The rotating speed $\omega$ of the rotating device corresponds to an angular speed of the rotating device. The angular acceleration $d\omega/dt$ of the rotating device is a time rate of change of the rotating speed $\omega$, i.e., a time derivative of the rotating speed $\omega$, and is a speed of change of the rotating speed $\omega$. In a mathematical formula, the angular acceleration $d\omega/dt$ is represented by "$\dot{\omega}$" ("$\omega$" with dot) where appropriate.

Hereinafter, some embodiments of the invention will be described in detail with reference to the accompanying drawings.

First Embodiment

Figure 1:
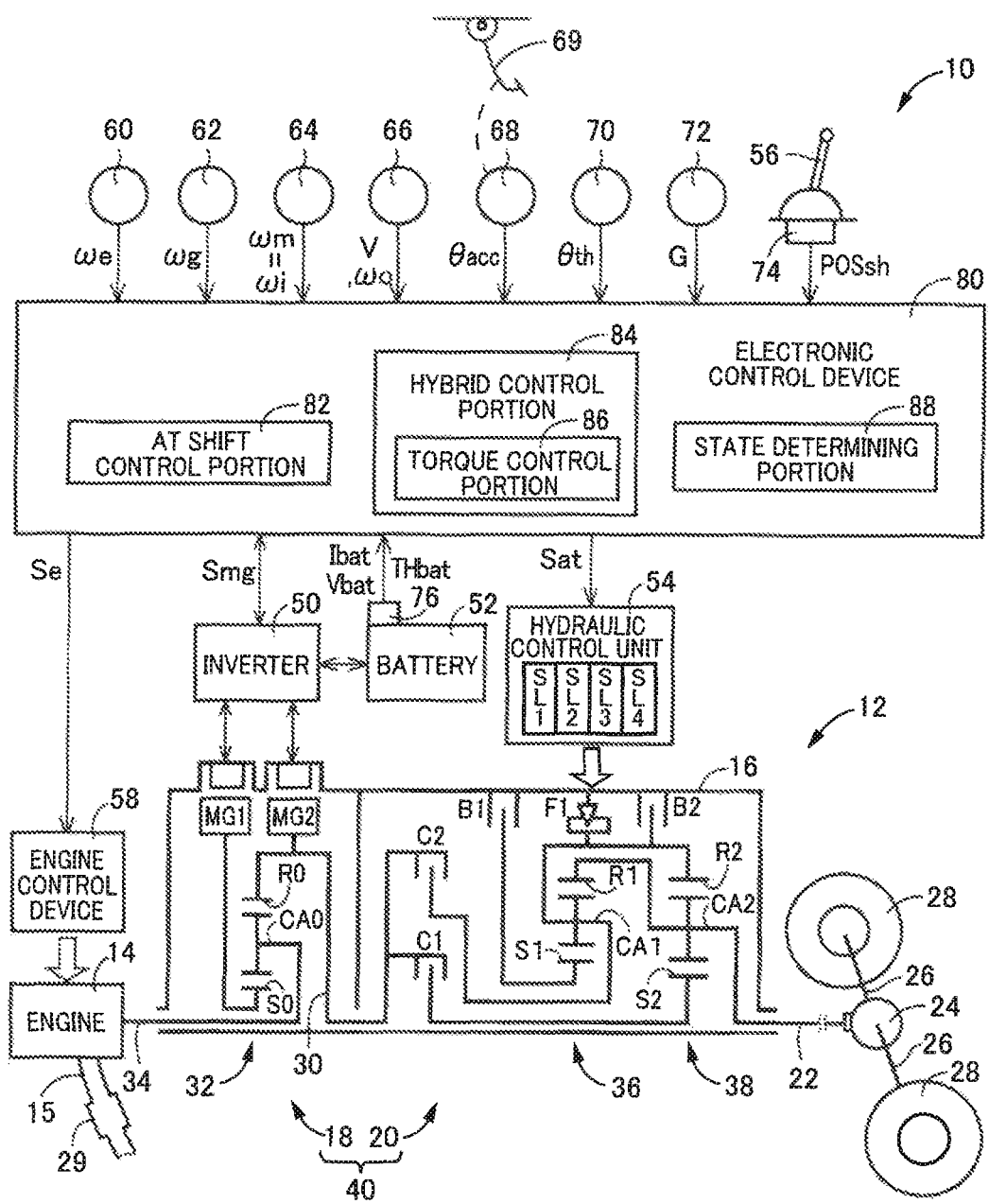
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1 the vehicular drive system 12 is provided with an engine 14 serving as a drive power source, an electrically-controlled continuously-variable transmission portion 18 (hereinafter referred to as "continuously-variable transmission portion 18") connected directly or indirectly via a damper (not shown) or any other device to the engine 14, and a mechanically-operated step-variable transmission portion 20 (hereinafter referred to as "step-variable transmission portion 20) connected to an output rotary member of the continuously-variable transmission portion 18. The continuously-variable transmission portion 18 and the step-variable transmission portion 20 are disposed in series with each other within a transmission casing 16 (hereinafter referred to as "casing 16") serving as a non-rotatable member fixed to a body of the vehicle 10, such that the transmission portions 18 and 20 are disposed coaxially with each other on a common axis. The vehicular drive system 12 is further provided with a differential gear device 24 connected to an output rotary member of the step-variable transmission portion 20 in the form of an output shaft 22, and a pair of axles 26 connected to the differential gear device 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear device 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously-variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously-variable transmission portion 18, without a fluid-operated type power transmitting device such as a torque converter or a fluid coupling being disposed between the engine 14 and the transmission portion 18. An exhaust gas (emission gas) emitted from the engine 14 passes through an exhaust pipe 15 of the engine 14, and flows into a catalyst 29 that is provided in the vehicle 10. Then, the exhaust gas is purified by the catalyst 29, and is discharged to the atmosphere. The catalyst 29 is disposed in the exhaust pipe 15 of the engine 14, and includes well-known three-way catalyst that removes hydrocarbon (HC), carbon monoxide (CO), nitrogen oxides (NOx) and the like contained in the exhaust gas.

The continuously-variable transmission portion 18 is provided with: a first motor/generator (first rotating machine) MG1; a differential mechanism 32 serving as a power distributing device to mechanically distribute the drive force of the engine 14 to the first motor/generator MG1, and to an intermediate power-transmitting member 30 that is an output rotary member of the continuously-variable transmission portion 18; and a second motor/generator (second rotating machine) MG2 connected to the intermediate power-transmitting member 30 in a power transmittable manner. The continuously-variable transmission portion 18 is an electrically-controlled continuously-variable transmission wherein a differential state of the differential mechanism 32 is controllable by controlling an operational state of the first motor/generator MG1. The first motor/generator MG1 serves as a differential motor/generator (differential electric motor) while the second motor/generator MG2 is an electric motor that serves as a drive power source, namely, a vehicle driving motor/generator (vehicle driving electric motor). The vehicle 10 is a hybrid vehicle provided with the drive power source in the form of the engine 14 and the second motor/generator MG2.

Each of the first motor/generator MG1 and the second motor/generator MG2 is an electrically-operated rotating device having a function of an electric motor and a function of an electric generator. The first motor/generator MG1 and the second motor/generator MG2 are connected to an electric-power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided in the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is connected to the engine 14 through a connecting shaft 34 in a power transmittable manner, and the sun gear S0 is connected to the first motor/generator MG1 in a power transmittable manner, while the ring gear R0 is connected to the second motor/generator MG2 in a power transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a power transmitting path between the intermediate power-transmitting member 30 and the drive wheels 28. The intermediate power-transmitting member 30 also serves as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power-transmitting member 30 such that the intermediate power-transmitting member 30 is rotated together with the second motor/generator MG2, or since the engine 14 is connected to an input rotary member of the continuously-variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices including a clutch C1, a clutch C2, a brake B1 and a brake B2. Hereinafter, the clutch C1, clutch C2, brake B1 and brake B2 will be referred to as "coupling devices CB" unless otherwise specified.

Each of the coupling devices CB is a hydraulically operated frictional coupling device in the form of a multiple-disc type or a single-disc type clutch or brake that is to be pressed by a hydraulic actuator, or a band brake that is to be tightened by a hydraulic actuator. The coupling devices CB are selectively placed in engaged, slipped or released states with their torque capacities (engaging torque values or transmitted torque values) Tcb being changed according to engaging hydraulic pressures PRcb applied thereto, which are regulated by respective solenoid-operated valves SL1-SL4 incorporated within a hydraulic control unit 54 provided in the vehicle 10. In order for each coupling device CB to be able to transmit a torque (for example, an AT input torque Ti which is an input torque of the step-variable transmission portion 20) between the intermediate power-transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (transmitted torque) to be transmitted through an engaging action of the coupling device CB. However, it is noted that an increase of the engaging torque Tcb enough to obtain the transmitted torque does not cause an increase of the transmitted torque. That is, the engaging torque Tcb is equivalent to a maximum value of the torque that can be transmitted through the coupling device CB, and the transmitted torque is equivalent to the torque that is actually transmitted through the coupling device CB. It is noted that the engaging torque (transmitted torque) Tcb and the engaging hydraulic pressure PRcb are substantially proportional to each other, except at a stage the engaging hydraulic pressure PRcb is raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power-transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different gear ratios (speed ratios) γat (=AT input rotating speed ωi/AT output rotating speed ωo). Namely, the step-variable transmission portion 20 is shifted up and down from one gear position to another by placing selected ones of the coupling devices E in the engaged state. The AT input rotating speed ωi is a rotating speed (angular velocity) of the input rotary member of the step-variable transmission portion 20, that is, a rotating speed of the intermediate power-transmitting member 30, which is equal to an MG2 rotating speed ωm that is an rotating speed of the second motor/generator MG2. Thus, the AT input rotating speed ωi can be represented by the MG2 rotating speed ωm. The AT output rotating speed ωo is a rotating speed of the output shaft 22 of the step-variable transmission portion 20, which is considered to be an output speed of a transmission device 40 which consists of the continuously-variable transmission portion 18 and the step-variable transmission portion 20.

Figures 2, 3:
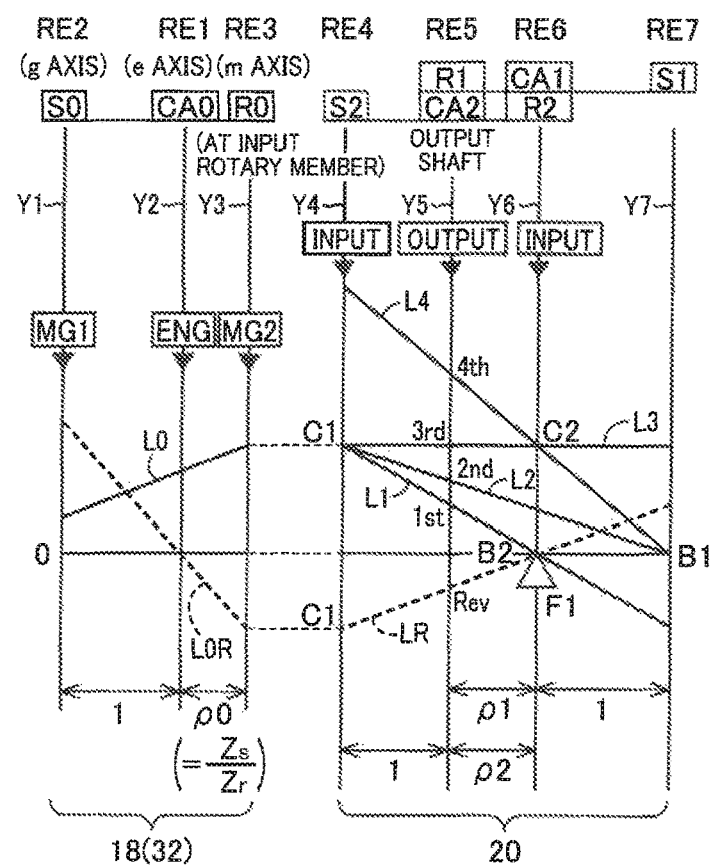
FIG. 2 is a table indicating a relationship between gear positions of a mechanically-operated step-variable transmission portion shown in FIG. 1 and combinations of coupling devices placed in engaged states to establish the respective gear positions.
FIG. 3 is a collinear chart indicating a relationship among rotating speeds of rotary elements of an electrically-controlled continuously-variable transmission portion and the mechanically-operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "1st", "2nd", "3rd" and "4th". The first speed AT gear position "1st" is the lowest-speed gear position having a highest gear ratio γat, while the fourth speed AT gear position "4th" is the highest-speed gear position having a lowest gear ratio γat. The gear ratio γat decreases in the direction from the first speed AT gear position (lowest-speed gear position) "1st" toward the fourth speed AT gear position (highest-speed gear position) "4th". In the table, "O" indicates the engaged state of the coupling devices CB, "Δ" indicates the engaged state of the brake B2 during application of an engine brake to the vehicle 10 or during a coasting shift-down action of the step-variable transmission portion 20 (i.e., a shift-down action of the step-variable transmission portion 20 while the vehicle 10 is in coasting run), and the blank indicates the released state of the coupling devices CB. The above-described one-way clutch F1 is disposed in parallel to the brake B2 that is placed in the engaged state to establish the first speed AT gear position "1st", so that the brake B2 is not required to be placed in the engaged state upon starting or acceleration of the vehicle 10. The shift-down action of the step-variable transmission portion 20 in coasting run of the vehicle 10 is a kind of a "power-off shift-down action" that is required as a result of reduction of a vehicle-speed-related value (vehicle running speed V, for example) due to reduction of a required drive force (as represented by an operation degree θacc of an accelerator pedal 69 that is operated by an operator of the vehicle 10) or during decelerating run of the vehicle 10 in a released position of the accelerator pedal 69 (with the operation degree θacc of the accelerator pedal 69 being zero or substantially zero), and is a shift-down action that is required during decelerating run of the vehicle 10 in the released position of the accelerator pedal 69. It is noted that the step-variable transmission portion 20 is placed in a neutral position, i.e., in a power transmission cutoff state when all of the coupling devices CB are placed in the released states.

The step-variable transmission portion 20 is shifted up or down to establish a newly selected one of the four AT gear positions, according to the operation degree θacc of the accelerator pedal 69 and the vehicle running speed V, with a releasing action of one of the coupling devices CB (that include the coupling devices CB) and an engaging action of another one of the coupling devices CB, which are controlled by the electronic control device 80, more specifically, by an AT shift control portion 82 configured to control shifting actions of the step-variable transmission portion 20. The above-indicated one coupling device CB (i.e., releasing coupling device) was placed in the engaged state before the step-variable transmission portion 20 is shifted to establish the newly selected AT gear position, while the above-indicated another coupling device CB (i.e., engaging coupling device) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, releasing and engaging actions of the selected two coupling devices CB. For instance, the step-variable transmission portion 20 is shifted down from the second speed AT gear position "2nd" to the first speed AT gear position "1st", with the release of the brake B1 and the engagement of the brake B2, as indicated in the table of FIG. 2. In this instance, the hydraulic pressures applied to the brakes B1 and B2 are transiently controlled to bring these brakes B1 and B2 into the released and engaged states, respectively. The releasing coupling device is one of the coupling devices CB which is involved in a shifting action of the step-variable transmission portion 20 and which is to be released in process of the shifting action of the step-variable transmission portion 20. The engaging coupling device is one of the coupling devices CB which is involved in a shifting action of the step-variable transmission portion 20 and which is to be engaged in process of the shifting action of the step-variable transmission portion 20.

The collinear chart of FIG. 3 indicates a relationship among rotating speeds of the rotary elements of the continuously-variable transmission portion 18 and the step-variable transmission portion 20. In this collinear chart, three vertical lines Y1, Y2 and Y3 corresponding to the respective three rotary elements of the differential mechanism 32 of the continuously-variable transmission portion 18 respectively represent a "g AXIS" representing the rotating speed of the second rotary element RE2 in the form of the sun gear S0, an "e AXIS" representing the rotating speed of the first rotary element RE1 in the form of the carrier CA0, and an "m AXIS" representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power-transmitting member 30. Thus, a rotary motion of the engine 14 is transmitted to the step-variable transmission portion 20 through the intermediate power-transmitting member 30. In a part of the collinear chart corresponding to the continuously-variable transmission portion 18, each of straight lines L0 and L0R intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power-transmitting member 30 through the clutch C1, the fifth rotary element RE5 is connected to the output shaft 22, the sixth rotary element RE6 is selectively connected to the intermediate power-transmitting member 30 through the clutch C2 and is selectively connected to the casing 16 through the brake B2 or the one-way clutch F1, and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth and reverse speed AT gear positions "1st", "2nd", "3rd", "4th" and "LR" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque that is a negative torque generated by the first motor/generator MG1 operated in the positive direction is applied to the sun gear S0, a directly transmitted engine torque Td(=Te/(1+ρ0)=-(1/ρ0)*Tg) that is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 serves as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier GA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in its non-operated state, so that an rotating speed ωe of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission portion 20 placed in the first speed AT gear position. To drive the vehicle 10 in the rearward direction, the electronic control device 80 (particularly, a hybrid control portion 84 configured to control running of the vehicle 10) described below is configured to command the second motor/generator MG2 to be rotated in a direction opposite to a direction during the forward running, so as to generate the reverse driving MG2 torque Tm (negative reverse driving torque) opposite to the forward driving MG2 torque Tm (positive forward driving torque), while the step-variable transmission portion 20 is placed in a low-speed AT gear position (first speed AT gear position, for example). Thus, the vehicle 10 is driven in the rearward direction with the reverse MG2 torque Tm while the step-variable transmission portion 20 is placed in one of the forward driving AT gear positions. In the hybrid drive mode, too, the second motor/generator MG2 can be rotated in the negative direction as indicated by the straight line L0R, so that the vehicle 10 can be driven in the rearward direction in the hybrid drive mode, as well as in the motor drive mode.

In the vehicular drive system 12, the continuously-variable transmission portion 18 serves as an electrically-controlled shifting mechanism (electrically-controlled differential mechanism) provided with the differential mechanism 32 the differential state of which is controlled by controlling the operational state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power-transmitting member 30 is connected (in other words, to which the second motor/generator MG2 is operatively connected). Namely, the continuously-variable transmission portion 18 has the differential mechanism 32 to which the engine 14 is operatively connected in a power transmittable manner, and the first motor/generator MG1 to which the differential mechanism 32 is operatively connected in a power transmittable manner, and the operational state of which is controlled to control the differential state of the differential mechanism 32. The continuously-variable transmission portion 18 is operated as an electrically-controlled continuously-variable transmission a gear ratio $\gamma 0 (=\omega e/\omega m)$ of which is variable. The gear ratio is a ratio of rotating speed of the connecting shaft 34 (namely, engine rotating speed $\omega e$) to the rotating speed of the intermediate power-transmitting member 30 (namely, MG2 rotating speed $\omega m$).

In the hybrid drive mode, for instance, the rotating speed of the sun gear S0 is increased or reduced by controlling the rotating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine rotating speed $\omega e$) is accordingly increased or reduced. In running with operation of the engine 14, therefore, the engine 14 can be operated at an efficient operating point. That is, the step-variable transmission portion 20 to be placed in a selected one of the AT gear positions and the continuously-variable transmission portion 18 serving as a continuously-variable transmission cooperate to provide the transmission device 40 in which the continuously-variable transmission portion 18 (differential mechanism 32) and the step-variable transmission portion 20 are disposed in series with each other and which serves as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions" although it may be referred also to as "conceptual speed positions") having respective different values of a gear ratio $\gamma t (=\omega e/\omega o)$ which is a ratio of the engine rotating speed $\omega e$ to the output speed $\omega o$. The gear ratio $\gamma t$ is an overall gear ratio of the transmission device 40 consisting of the continuously-variable transmission portion 18 and the step-variable transmission portion 20 which are disposed in series with each other. The overall gear ratio $\gamma t$ is equal to a product of the gear ratio $\gamma 0$ of the continuously-variable transmission portion 18 and the gear ratio $\gamma at$ of the step-variable transmission portion 20, namely, $\gamma t = \gamma 0 * \gamma at$.

Figures 4, 5:
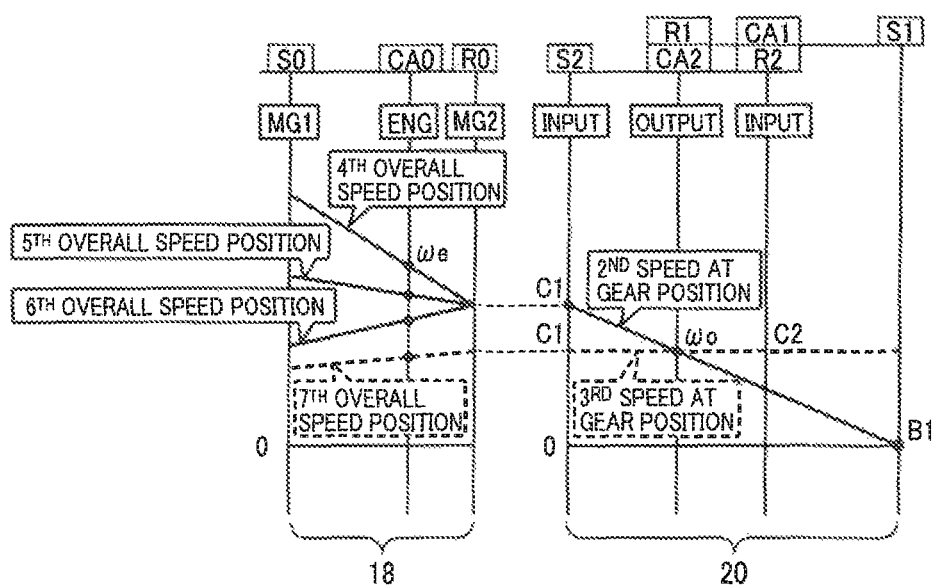
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different gear ratio values $\gamma 0$ of the continuously-variable transmission portion 18. FIG. 4 is the table indicating an example of the overall speed positions of the transmission device 40, wherein the first through third overall speed positions are established for the first speed AT gear position, the fourth through sixth overall speed positions are established for the second speed AT gear position, seventh through ninth overall speed positions are established for the third speed AT gear position, and the tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine rotating speed $\omega e$ with respect to the output speed $\omega o$ for establishing the predetermined overall gear ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine rotating speed $\omega e$; an output signal of an MG1 speed sensor 62 indicative of the MG1 speed $\omega g$ which is the rotating speed of the first motor/generator MG1; an output signal of an MG2 speed sensor 64 indicative of the MG2 speed $\omega m$ that is the AT input rotating speed $\omega i$; an output signal of an output speed sensor 66 indicative of the output speed $\omega o$ corresponding to the vehicle running speed V; an output signal of an accelerator-pedal operation degree sensor 68 indicative of the operation degree $\theta acc$ of a vehicle-acceleration operation member in the form of the accelerator pedal 69, which operation degree $\theta acc$ represents a degree of acceleration of the vehicle 10 required by the vehicle operator; an output signal of a throttle valve opening angle sensor 70 indicative of an angle $\theta th$ of opening of an electronic throttle valve; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat; and a charging/discharging electric current Ibat and a voltage Vbat of the battery 52. Further, the electronic control device 80 generates various output signals to the various devices provided in the vehicle 10, such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operational states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current or a drive voltage corresponding to the hydraulic pressure command value, so that the outputted drive current or voltage is supplied to the hydraulic control unit 54.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be charged to the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of an AT shift control portion 82, and a hybrid control means or portion in the form of a hybrid control portion 84, for performing various controls in the vehicle 10. It is noted that the hybrid control portion 84 serves also as a drive-power source control portion.

The AT shift control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed $\omega$o (equivalent to the vehicle running speed V) and the accelerator-pedal operation degree $\theta$acc (equivalent to a required drive torque Tdem and the throttle valve opening angle $\theta$th), which relationship is used to determine a shifting action of the step-variable transmission portion 20 and is represented by shift-up and shift-down shifting lines in a two-dimensional coordinate system in which the output speed $\omega$o and the accelerator-pedal operation degree $\theta$acc are taken along respective two axes. The shifting lines in the AT gear position shifting map consist of shift-up lines (indicated by solid lines in FIG. 6) for determining a shift-up action of the step-variable transmission portion 20, and shift-down lines (indicated by broken lines in FIG. 6) for determining a shift-down action of the step-variable transmission portion 20. Each of the shifting lines is defined by a series of shifting points which are determined such that the step-variable transmission portion 20 should be shifted up or down when the output speed $\omega$o becomes higher or lower than the shifting point at a given value of the accelerator-pedal operation degree $\theta$acc or the regenerative torque, or when the accelerator-pedal operation degree $\theta$acc or the regenerative torque becomes larger or smaller than the shifting point at a given value of the output speed $\omega$o.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator-pedal operation degree $\theta$acc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem. For example, the engine control command signal Se represents a command value of an engine power Pe which is a power of the engine 14 outputting the torque Te at its present rotating speed $\omega$e. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed $\omega$g, and an electric power amount Wm to be consumed by the second motor/generator MG2 to generate the MG2 torque Tm at the present MG2 rotating speed $\omega$m.

When the transmission device 40 as a whole is operated as the continuously-variable transmission with the continuously-variable transmission portion 18 being operated as the continuously-variable transmission, for instance, the hybrid control portion 84 controls the engine 14 and the electric power amount Wg to be generated by the first motor/generator MG1, so as to establish the engine rotating speed ωe and the engine torque Te for obtaining the engine power Pe to establish the required vehicle drive power Pdem, while taking account of a highest fuel economy point of the engine 14, so that the gear ratio γ0 of the continuously-variable transmission portion 18 is controlled so as to be continuously varied. As a result, the gear ratio γt of the transmission device 40 is controlled while the continuously-variable transmission portion 18 is operated as the continuously-variable transmission.

When the transmission device 40 as a whole is operated as the step-variable transmission with the continuously-variable transmission portion 18 being operated as the step-variable transmission, for instance, the hybrid control portion 84 determines a shifting action of the transmission device 40 according to an overall speed-position shifting map, for example, and performs a shifting control of the continuously-variable transmission portion 18 to establish a selected one of the plurality of overall speed positions, in cooperation with the AT shift control portion 82 to shift the step-variable transmission portion 20 selectively to the AT gear positions. The plurality of overall speed positions can be established by controlling the first motor/generator MG1 to control the engine rotating speed ωe according to the output speed ωo so as to maintain the respective gear ratio values γt. It is noted that the gear ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
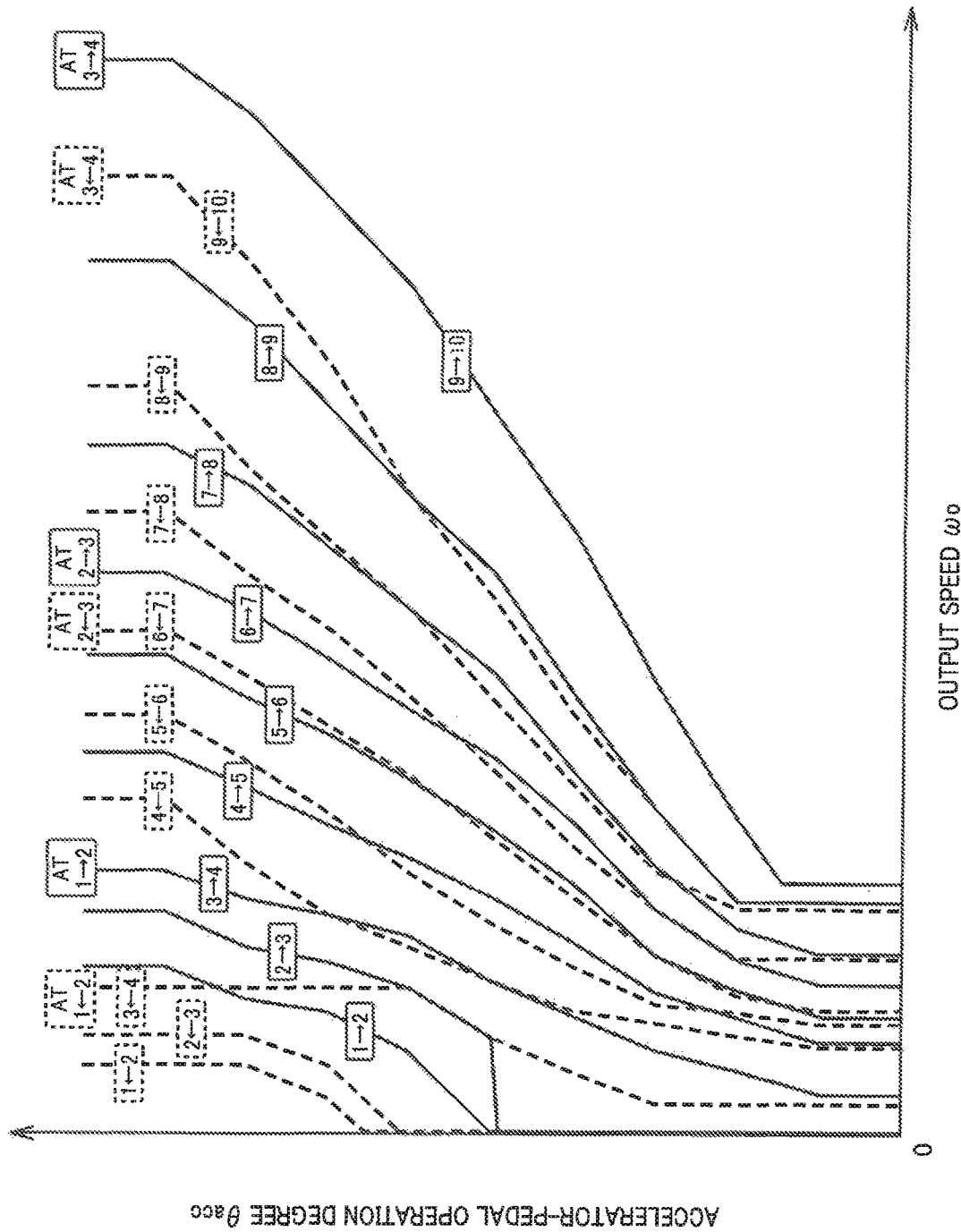
FIG. 6 is a view illustrating an example of an overall speed-position shifting map used to shift up and down the transmission device from each of the overall speed positions to the adjacent position or positions.

Like the AT gear position shifting map, the above-indicated overall speed-position shifting map is a relationship between the output speed ωo and the accelerator-pedal operation degree θacc as parameters. FIG. 6 is the view illustrating an example of the overall speed-position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed-position shifting map, as if the transmission device 40 was shifted like a step-variable transmission as a whole. This overall shifting control to control the shifting actions of the transmission device 40 as the step-variable transmission as a whole may be implemented preferentially to the continuously-variable shifting control of the transmission device 40 as the continuously-variable transmission as a whole, when a sporty drive mode or any other high-drivability drive mode is selected by the vehicle operator, or when the required drive torque Tdem is comparatively high, but may be principally implemented except where the overall shifting control is restricted or inhibited.

The overall shifting control by the hybrid control portion 84 and the shifting control of the step-variable transmission portion 20 by the AT shift control portion 82 are implemented in cooperation with each other. In this embodiment, the first through tenth overall speed positions are established for the first through fourth speed AT gear positions. When the transmission device 40 is shifted between the third overall speed position and the fourth overall speed position, for example, the step-variable transmission portion 20 is shifted between the first speed AT gear position and the second speed AT gear position. When the transmission device 40 is shifted between the sixth overall speed position and the seventh overall speed position, the step-variable transmission portion 20 is shifted between the second speed AT gear position and the third speed AT gear position. When the transmission device 40 is shifted between the ninth overall speed position and the tenth overall speed position, the step-variable transmission portion 20 is shifted between the third speed AT gear position and the fourth speed AT gear position. (See FIG. 4) Therefore, the AT gear position shifting map is formulated such that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the AT shift control portion 82 in response to a determination according to the overall speed-position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The AT shift control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine rotating speed ωe, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor-drive mode range, and selects the hybrid drive mode when the required vehicle drive power Pdem is equal to or higher than the threshold value, that is, within a predetermined hybrid-drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

When a temperature of the catalyst 29 (hereinafter simply referred to as "catalyst temperature") is lower than a predetermined value, the hybrid control portion 84 facilitates warming-up of the catalyst 29, by maintaining the engine rotating speed $\omega e$ at a predetermined value or higher. For example, as long as the catalyst temperature is lower than the predetermined value, even if the required vehicle drive power Pdem is within the motor-drive mode range, the hybrid control portion 84 establishes the hybrid drive mode and starts the engine 14. In this instance, the engine rotating speed $\omega e$ is controlled, by the hybrid control portion 84, to be held at the predetermined value, so as to warm up the catalyst 29. The hybrid control portion 84 calculates an estimated value of temperature of exhaust gas emitted from the engine 14 (hereinafter simply referred to as "exhaust temperature"), for example, by applying a load of the engine 14 (e.g., intake air amount) and the engine rotating speed $\omega e$ to a predetermined relationship (exhaust temperature map) for calculating an estimated value of the exhaust temperature. Then, the hybrid control portion 84 calculates an estimated value of the catalyst temperature, for example, by applying the estimated value of the exhaust temperature which was calculated as described above and which was subjected to a primary delay processing, to a predetermined relationship (catalyst-temperature calculation formula) for calculating the estimated value of the catalyst temperature. The above-described predetermined value of the catalyst temperature is a predetermined threshold value (lower limit value), which is minimally required, for example, to determine that the catalyst 29 sufficiently exhibits a gas purification performance. The above-described predetermined value of the engine rotating speed $\omega e$ is a predetermined lower limit value which is minimally required to facilitate the warming up of the catalyst 29.

There will be described a control operation performed for shifting of the transmission device 40 when the shilling of the transmission device 40 is accompanied by a shifting action of the step-variable transmission portion 20. The hybrid control portion 84 functionally includes a torque controlling means or portion in the form of a torque control portion 86 that is configured, when the shifting action of the step-variable transmission portion 20 is to be performed by the AT shift control portion 82, to control the MG1 torque Tg and the MG2 torque Tm on the basis of the engine torque Te and the transmitted torque transmitted through the step-variable transmission portion 20, such that a MG2 angular acceleration $d\omega m/dt$ of the second motor/generator MG2 (representing a rotational state of the input rotary member of the step-variable transmission portion 20) and an engine angular acceleration $d\omega e/dt$ of the engine 14 (representing a rotational state of the engine 14) coincide with respective predetermined target values. The control of the MG1 torque Tg and the MG2 torque Tm is equivalent to the control of the AT input torque Ti, namely, the AT input torque Ti can be controlled by controlling the the MG1 torque Tg and the MG2 torque Tm, because a sum of the MG2 torque and the directly transmitted engine torque Td applied to the ring gear R0 owing to the reaction torque by the MG1 torque Tg that acts against the engine torque Te is equal to the input torque Ti of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on shifting modes are implemented when the accelerator pedal operation amount $\theta acc$ is increased or when the vehicle running speed V is raised while the accelerator pedal 69 is kept in an operated position, and the shifting controls in the power-off shifting modes are implemented when the accelerator pedal operation amount $\theta acc$ is reduced or when the vehicle running speed V is lowered while the accelerator pedal 69 is kept in its non-operated or fully released position. If none of the two coupling devices to be respectively brought into the released and engaged states is given the transmitted torque Tcb, the AT input speed $\omega i$ is naturally raised in the power-on shifting modes, and is naturally lowered in the power-off shifting modes. Accordingly, the shifting action is preferably initiated by increasing the transmitted torque Tcb of the coupling device CB which is to be brought into the engaged state for the shifting action, in the power-on shift-up and power-off shift-down modes in which the AT input speed $\omega i$ is not naturally changed to a predetermined synchronizing speed $\omega isyca(=\omega o \times speed\ ratio\ \gamma ata$ to be established upon completion of the shifting action) if none of the two coupling devices to be respectively brought into the released and engaged states is given the transmitted torque Tcb. On the other hand, the shifting action is preferably initiated by reducing the transmitted torque Tcb of the coupling device CB which has been placed in the engaged state before the shifting action and which is to be brought into the released state for the shifting action, in the power-off shift-up and power-on shift-down modes in which the AT input speed $\omega i$ is naturally changed to the predetermined synchronizing speed $\omega isyca$ even if none of the two coupling devices to be respectively brought into the released and engaged states is given the transmitted torque Tcb. Thus, the coupling device CB to be brought into the engaged state in the power-on shift-up and power-off shift-down modes is the initiative coupling device the transmitted torque Tcb of which is controlled to progressively implement the shifting action, while the coupling device CB to be brought into the released state in the power-off shift-up and power-on shift-down modes is the initiative coupling device the transmitted torque Tcb of which is controlled to progressively implement the shifting action.

Described more specifically, the hybrid control portion 84 (particularly, torque control portion 86) is configured to calculate the MG1 torque Tg and the MG2 torque Tm according to the following mathematical equation (1), and on the basis of the target values of the MG2 angular acceleration $d\omega m/dt$ and the engine angular acceleration $d\omega e/dt$, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g AXIS", "e AXIS" and "m AXIS" of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, . . . , b11, . . . , c22 in 2×2 matrices in the mathematical equation (1) represent combinations of parameters such as the inertia values of the rotary members of the continuously variable transmission portion 18, and the gear ratio ρ0 of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

For example, the target values of the MG2 angular acceleration dωm/dt and the engine angular acceleration dωe/dt in the above equation (1) are predetermined so as to represent desired behaviors of the MG2 speed ωm and engine rotating speed ωe during the shifting action, depending upon (i) the presently established one of the shifting modes of the step-variable transmission portion 20, (ii) the specific shifting action of the step-variable transmission portion 20 to be performed between the AT gear positions, (iii) the specific shifting action of the transmission device 40 to be performed between the overall speed positions, and (iv) the operational state of the engine 14, namely, depending upon (i) which one of the shifting modes (such as the above-described power-on shift-up mode, power-off shift-up mode, power-on shift-down mode and power-off shift-down mode) is to be performed in the step-variable transmission portion 20, (ii) between which AT speed positions the shifting action is to be performed in the step-variable transmission portion 20, (iii) between which overall speed positions the shifting action is to be performed in the transmission device 40, and (iv) whether the engine 14 is in its normal operation state (that is described below) or not. Further, the target values are compensated as needed, during the shifting action. The engine torque Te in the mathematical equation (1) is a required engine torque Tedem at the engine rotating speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m AXIS" in FIG. 3) which are obtained by conversion from the transmitted torques Tcb transmitted through the respective coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is a model formula, i.e., an equation for a theoretical model of the shifting action of the step-variable transmission portion 20. In this respect, the transmitted torque Tcb of the initiative coupling device CB which is controlled to progressively implement the shifting action is used as the AT-transmitted torque Tat in the mathematical equation (1). The transmitted torque Tcb used as the AT-transmitted torque Tat in the mathematical equation (1) is a feed-forward value.

For instance, the AT shift control portion 82 sets the transmitted torque Tcb of the initiative coupling device CB on the basis of a required input torque (hereinafter referred to as "basic required vehicle-drive-torque") corresponding to the required vehicle drive power Pdem, and according to an appropriate one of a plurality of predetermined relationships between the transmitted torque Tcb and the basic required vehicle-drive-torque, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions. For example, the basic required vehicle-drive-torque is a torque of the intermediate power transmitting member 30 obtained by conversion from the required drive torque Tdem, or the AT input torque Ti corresponding to the required engine power Pedem for establishing the required drive power Pdem. Therefore, it can be said that the torque control portion 86 is configured, during the shifting action of the step-variable transmission portion 20, to implement a feedback control to control the AT input torque Ti, on the basis of the transmitted torque transmitted through the step-variable transmission portion 20, such that the engine angular acceleration dωe/dt as a value representing the rotational state of the engine 14 coincides with a target value.

As various kinds of running of the vehicle 10 which are different in terms of the operational state of the engine 14, there are, for example, (i) a motor running in a state in which the engine 14 is stopped (held at rest), (ii) a motor running in which the engine 14 is operated exclusively for warming up the catalyst 29 and (iii) an engine running in which the engine 14 is operated. In the shifting control of the transmission device 40 which is executed during stop of the engine 14 and which is accompanied by a shifting action of the step-variable transmission portion 20, it is preferable that, when the engine rotating speed ωe is to be held at substantially zero, the engine rotating speed ωe is controlled with a high accuracy, so as to avoid shock upon restart of the engine 14. In the shifting control of the transmission device 40 which is executed during the catalyst warming-up and which is accompanied by a shifting action of the step-variable transmission portion 20, it is preferable that the engine rotating speed ωe is controlled with a high accuracy, for maintaining the engine rotating speed ωe constantly at a predetermined value for facilitating the catalyst warming-up, so as to avoid the emissions from being worse. In the shifting control of the transmission device 40 which is executed during a first operational state of the engine 14 that corresponds to the normal operation state of the engine 14 (in which the engine 14 is operated without purpose of the catalyst warming-up) and which is accompanied by a shifting action of the step-variable transmission portion 20, it is preferable that the drivability (such as reduction of time required for completing the shifting action) is improved, because it is considered that there is a higher need for the drive force (in other words, unsatisfactory acceleration feeling is more likely to be given to a vehicle operator) when the vehicle 10 is running by the engine 14, than when the vehicle 10 is running by the motor/generator. It is noted that, as the shifting control of the transmission device 40 which is executed during the normal operation state of the engine 14 and which is accompanied by a shifting action of the step-variable transmission portion 20, there is an overall shifting control of the transmission device 40 in which the engine rotating speed ωe is changed by switching from one of the overall speed positions to another, and a non-overall shifting control of the transmission device 40 in which switching among the AT gear positions is made in the step-variable transmission portion 20 without switching among the overall speed positions so that the engine rotating speed ωe is kept substantially constant.

In the shifting control of the transmission device 40 which is executed during a second operational state of the engine 14 that corresponds to an engine stop state in which the engine 14 is stopped and/or a catalyst warming-up state in which the engine 14 is operated to warm up the catalyst 29 and which is accompanied by a shifting action of the step-variable transmission portion 20, a high priority is given to increase of the accuracy of control of the engine rotating speed ωe, so that the AT shift control portion 82 causes the shifting action of the step-variable transmission portion 20 to be progressed by slowly increasing the engaging hydraulic pressure PRcb of the engaging coupling device. Even if an actual value (actual pressure) relative to a command value of the engaging hydraulic pressure PRcb varies in terms of the responsiveness or followability due to individual variation of the step-variable transmission portion 20, the engine rotating speed ωe is less likely to be deviated from the target value in the process of the shifting action of the step-variable transmission portion 20, without much influence by the individual variation, owing to the arrangement in which the shifting action of the step-variable transmission portion 20 is progressed with the command value of the engaging hydraulic pressure PRcb of the engaging coupling device being slowly increased (namely, with the command value being controlled to be relatively low), for facilitating the actual pressure to follow the command value. Therefore, it is possible to increase the accuracy of the control of the engine rotating speed ωe.

On the other hand, in the shifting control of the transmission device 40 which is executed during the normal operation state of the engine 14 and which is accompanied by a shifting action of the step-variable transmission portion 20, a high priority is given to improvement of the drivability (reduction of time required for completing the shifting action), so that the AT shift control portion 82 causes the shifting action of the step-variable transmission portion 20 to be completed in a short length of time by rapidly increasing the engaging hydraulic pressure PRcb of the engaging coupling device. Owing to the arrangement in which the shifting action of the step-variable transmission portion 20 can be rapidly progressed with the command value of the engaging hydraulic pressure PRcb of the engaging coupling device being rapidly increased (namely, with the command value being controlled to be relatively high), it is possible to reduce the time required to complete the shifting action.

Specifically, the electronic control device 80 further includes a state determining means or portion in the form of a state determining portion 86, for implementing a control for improving the accuracy of the control of the engine rotating speed ωe and improving the drivability, depending on the operational state of the engine 14, when a shifting action of the step-variable transmission portion 20 is executed.

The state determining portion 88 determines the operational state of the engine 14. Specifically, the state determining portion 88 determines whether the engine 14 is stopped or not, determines whether the engine 14 is operated for the catalyst warming-up, and determines whether the engine 14 is in the normal operation state. When the engine 14 is stopped or operated for catalyst warming-up, a required degree of the accuracy of control of the engine rotating speed ωe is high. When the engine 14 is in the normal operation state, the required degree of the accuracy of control of the engine rotating speed ωe is not high. Thus, the state determining portion 88 determines whether the required degree of the accuracy of control of the engine rotating speed ωe is high or not, by determining the operational state of the engine 14.

The AT shift control portion 82 controls the engaging hydraulic pressure PRcb of the engaging coupling device in process of a shifting action of the step-variable transmission portion 20, such that the engaging hydraulic pressure PRcb is made lower when it is determined by the state determining portion 88 that the engine 14 is in the second operational state, namely, the engine 14 is stopped or operated for the catalyst warming-up, than when it is determined by the state determining portion 88 that the engine 14 is in the first operational state corresponding to the normal operation state.

The shifting action of the step-variable transmission portion 20, during which the accuracy of control of the engine rotating speed ωe and the drivability are to be improved depending on the operational state of the engine 14, is, for example, a power-on shift-up action that is a shift-up action executed with the vehicle-acceleration operation member (e.g., the accelerator pedal 69) being placed in the operated position. The arrangement in which, in process of a shifting action of the step-variable transmission portion 20, the engaging hydraulic pressure PRcb of the engaging coupling device is made lower when the engine 14 is stopped or operated for the catalyst warming-up, than when the engine 14 is in the normal operation state, is useful, particularly, upon execution of the power-on shift-up action of the step-variable transmission portion 20 in which an initiative coupling device (i.e., one of the coupling devices that causes the shifting action to be progressed) is the engaging coupling device and in which it is considered that there is a higher need for the drive force when the vehicle 10 is in the normal operation state.

Specifically, when it is determined by the state determining portion 88 that the engine 14 is stopped or operated for the catalyst warming-up, namely, when it is determined by the state determining portion 88 that the engine 14 is in the second operational state in which the required degree of the accuracy of control of the engine rotating speed ωe is high, the AT shift control portion 82 determines, as the transmitted torque Tcb of the engaging coupling device to be applied in the shifting control using the mathematical equation (1), a reduced transmitted torque Tcb that is lower, by a predetermined torque A, than the transmitted torque Tcb of the initiative coupling device that is determined based on the basic required vehicle-drive-torque, and then determines the engaging hydraulic pressure PRcb of the engaging coupling device which provides the engaging coupling device with the reduced transmitted torque Tcb. The above-described predetermined torque A is, for example, a predetermined reduction value that is predetermined for setting the engaging hydraulic pressure PRcb to a low value that causes the shifting action of the step-variable transmission portion 20 to be progressed slowly.

On the other hand, when it is determined by the state determining portion 88 that the engine 14 is in the normal operation state, namely, when it is determined by the state determining portion 88 that the engine 14 is in the first operational state in which the required degree of the accuracy of control of the engine rotating speed toe is not high, the AT shift control portion 82 determines, as the transmitted torque Tcb of the engaging coupling device to be applied in the shifting control using the mathematical equation (1), a transmitted torque Tcb of the initiative coupling device that is determined based on the basic required vehicle-drive-torque, and then determines the engaging hydraulic pressure PRcb of the engaging coupling device which provides the engaging coupling device with the determined transmitted torque Tcb. Or alternatively, when it is determined by the state determining portion 88 that the engine 14 is in the normal operation state (first operational state), the AT shift control portion 82 determines, as the transmitted torque Tcb of the engaging coupling device to be applied in the shifting control using the mathematical equation (1), an increased transmitted torque Tcb that is higher, by a predetermined torque B, than the transmitted torque Tcb of the initiative coupling device that is determined based on the basic required vehicle-chive-torque, and then determines the engaging hydraulic pressure PRcb of the engaging coupling device which provides the engaging coupling device with the increased transmitted torque Tcb. The above-described predetermined torque B is, for example, a predetermined increase value that is predetermined for setting the engaging hydraulic pressure PRcb to a high value that causes the shifting action of the step-variable transmission portion 20 to be progressed rapidly.

When the operational state of the engine 14 is first operational state (normal operation state), the shifting action of the step-variable transmission portion 20 is progressed with the engaging hydraulic pressure PRcb being set to a relatively high value. However, in the present embodiment, when it is determined by the state determining portion 88 that the engine 14 is in the first operational state, the AT shift control portion 82 temporarily reduces the engaging hydraulic pressure PRcb of the engaging coupling device, which has been increased toward a value that causes the engaging coupling device to be engaged, at a final stage of the shifting action, shortly before completion of the shifting action. Thus, it is possible to prevent a shock from being caused upon completion of engagement of the engaging coupling device.

When it is determined by the state determining portion 88 that the engine 14 is in the second operational state in which the engine 14 is stopped or operated for the catalyst warming-up, the torque control portion 86 determines, as a target value of the engine angular acceleration $d\omega e/dt$ to be applied in the shifting control using the mathematical equation (1), zero as a value that causes the engine rotating speed $\omega e$ to held substantially constant in process of the shifting action of the step-variable transmission portion 20. Further, in event of fluctuation of the engine rotating speed $\omega e$, the torque control portion 86 compensates the target value of the engine angular acceleration $d\omega e/dt$ with a high priority such that the engine rotating speed $\omega e$ is held substantially constant.

When the engine 14 is stopped, it is preferable that the engine rotating speed toe is held substantially constant at zero. In event of fluctuation of the engine rotating speed $\omega e$, at least a situation in which the engine 14 is rotated in a negative direction should be avoided. When the engine 14 is operated for the catalyst warming-up, it is preferable that the engine rotating speed $\omega e$ is held substantially constant at a predetermined value for facilitating the catalyst warming-up. In event of fluctuation of the engine rotating speed $\omega e$, at least a situation in which the engine rotating speed me is made lower than the predetermined value. For avoiding these situations, when it is determined by the state determining portion 88 that the engine 14 is in the second operational state, the step-variable transmission portion 20 may be configured to compensate the target value of the engine angular acceleration $d\omega e/dt$ with a high priority such that the rotating speed $\omega e$ is not made lower than the substantially constant value in in process of the shifting action of the step-variable transmission portion 20.

When it is determined by the state determining portion 88 that the engine 14 is in the first operational state (normal operation state), the torque control portion 86 determines the target value of the engine, angular acceleration $d\omega e/dt$ that is to be applied in the shifting control using the mathematical equation (1), depending on whether the shifting control of the transmission device 40 is the overall shifting control or the non-overall shifting control. When the shifting control of the transmission device 40 is the overall shifting control, the torque control portion 86 sets the target value of the engine angular acceleration $d\omega e/dt$, to a value that causes the engine rotating speed roe to be changed to a target rotating speed ($=\omega o*$the gear ratio $\gamma t$ of the transmission device 40 after the shifting action) within a target shifting time (a target length of time for completing the shifting action) in process of the shifting action of the step-variable transmission portion 20. The target shifting time is determined, for example, depending on between which overall speed positions the transmission device 40 is to be shifted. On the other hand, when the shifting control of the transmission device 40 is the non-overall shifting control, the torque control portion 86 sets the target value of the engine angular acceleration $d\omega e/dt$, to zero as value that causes the engine rotating speed $\omega e$ to be kept substantially constant in process of the shifting action of the step-variable transmission portion 20.

Figure 7:
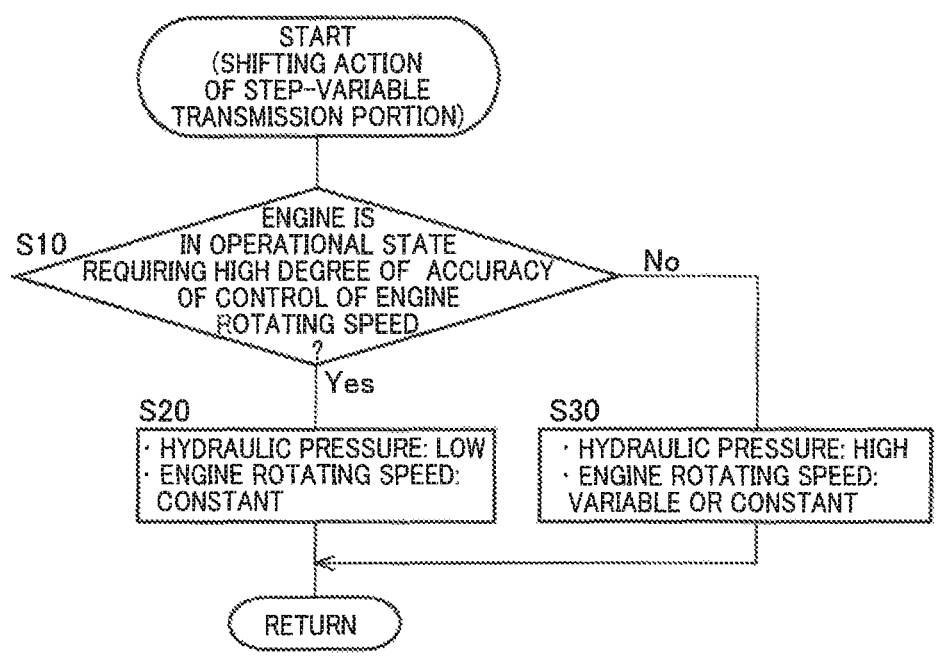
FIG. 7 is a flow chart illustrating an essential part of a main control routine executed by an electronic control device, namely, a control routine that is executed, upon execution of a shifting action of the step-variable transmission portion, in a manner variable depending on an operational state of the engine, so as to improve an accuracy of control of the engine rotating speed and also improve a drivability of the vehicle.

FIG. 7 is a flow chart illustrating an essential part of a main control routine executed by the electronic control device 80, namely, a control routine that is executed, upon execution of a shifting action of the step-variable transmission portion 20, in a manner variable depending on the operational state of the engine 14, so as to improve the accuracy of control of the engine rotating speed $\omega e$ and also improve the drivability. This control routine is executed, for example, in a repeated manner, in process of the shifting action of the step-variable transmission portion 20. Each of FIGS. 8 and 9 is an example of a time chart where the control routine illustrated by the flow chart of FIG. 7 is executed.

The control routine of FIG. 7 is initiated with step S10 corresponding to function of the state determining portion 88, to determine whether or not the engine 14 is in an operational state in which the required degree of the accuracy of control of the engine rotating speed $\omega e$ is high, namely, determine whether or not the engine 14 is in the above-described second operational state in which the engine 14 is stopped or operated for the catalyst warming-up. If an affirmative determination is made at step S10, the control flow goes to step S20 corresponding to functions of the AT shift control portion 82 and the torque control portion 86. At step S20, the engaging hydraulic pressure PRcb of the engaging coupling device is set to a relatively low value, whereby the engaging hydraulic pressure PRcb is increased slowly taking a time, so that the shifting action of the step-variable transmission portion 20 is progressed with the engaging hydraulic pressure PRcb being set to a relatively low value (e.g., a minimum value minimally required to cause the shifting action to be progressed). Thus, a control to temporarily reduce the engaging hydraulic pressure PRcb at a final stage in process of the shifting action, is not executed. Further, at step S20, the target value of the engine angular acceleration $d\omega e/dt$ is determined such that the engine rotating speed $\omega e$ is controlled to be constant as much as possible. If a negative determination is made at step S10, namely, if it is determined that the engine 14 is in the above-described first operational state corresponding to the normal operation state, the control flow goes to step S30 corresponding to functions of the AT shift control portion 82 and the torque control portion 86. At step S30, the engaging hydraulic pressure PRcb of the engaging coupling device is set to a relatively high value, whereby the shifting action of the step-variable transmission portion 20 is progressed with the engaging hydraulic pressure PRcb being set to a relatively high value, so that the shifting action is completed in a short length of time, with a higher priority being given to the drivability (reduction of time required for completing the shifting action). The control to temporarily reduce the engaging hydraulic pressure PRcb at a final stage in process of the shifting action, is executed for reducing a shifting shock. Further, when the shifting control of the transmission device 40 is the overall shifting control, the engine rotating speed ωe is controlled with the engine angular acceleration dωe/dt being controlled to the target value that is determined depending on the target shifting time. When the shifting control of the transmission device 40 is the non-overall shifting control, the engine rotating speed ωe is controlled with the engine angular acceleration dωe/dt being controlled to the target value that causes the engine rotating speed ωe to be kept substantially constant. It is noted that the engine rotating speed ωe is allowed to be fluctuated by a certain degree, either in the overall shifting control or non-overall shifting control.

Figure 8:
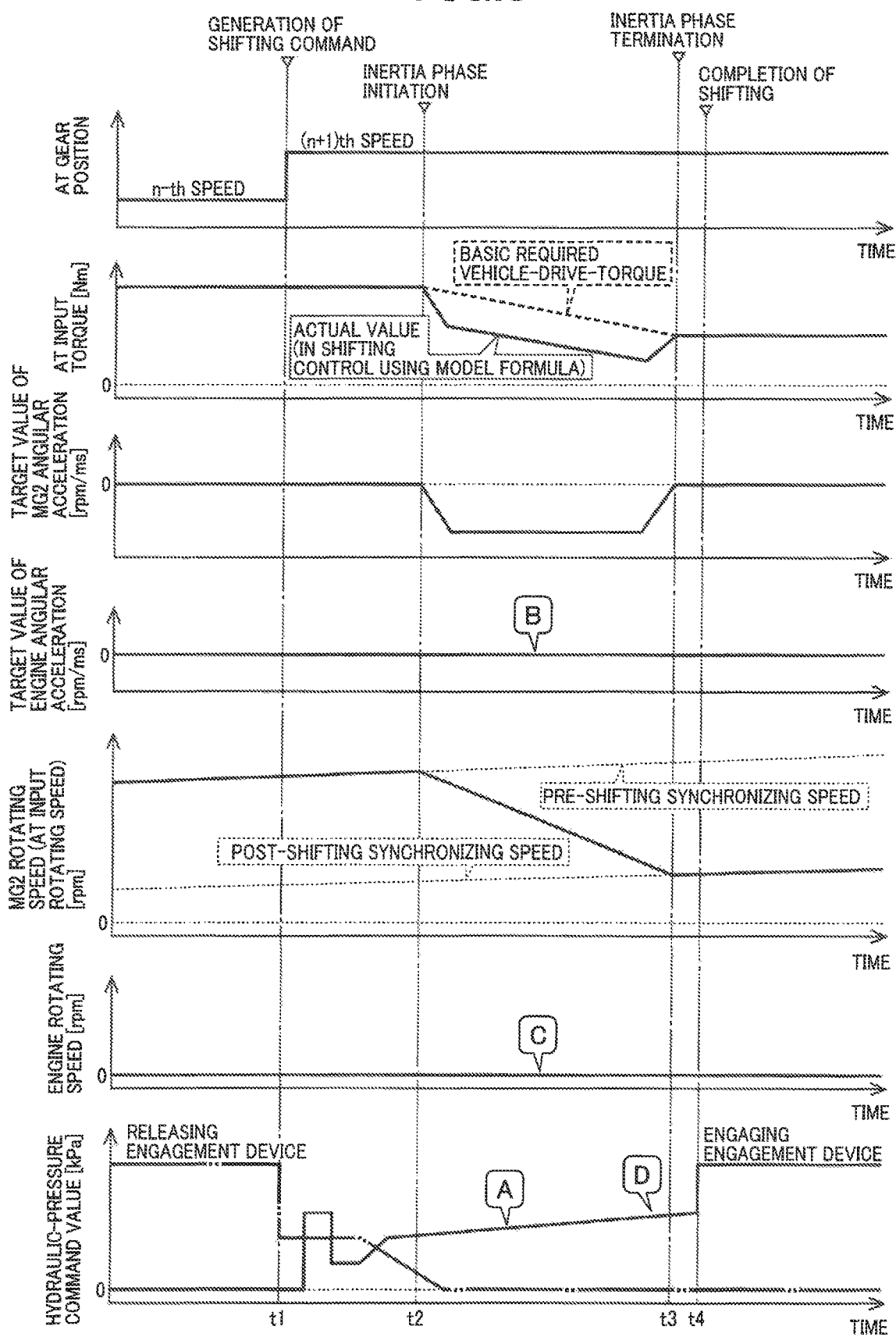
FIG. 8 is an example of a time chart where the control routine illustrated by the flow chart of FIG. 7 is executed upon execution of a shifting of the transmission device, which is accompanied by a shift-up action of the step-variable transmission portion, during stop of the engine.

FIG. 8 is an example of a time chart where the control routine illustrated by the flow chart of FIG. 7 is executed upon execution of a shifting of the transmission device 40, which is accompanied by a shift-up action of the step-variable transmission portion 20, during stop of the engine 14. In FIG. 8, a point t1 of time indicates a point of time at which output of command requesting execution of a shift-up action (n→n+1) is initiated. When the output of the shift-up command is initiated, a command value of the engaging hydraulic pressure PRcb of the releasing coupling device (see two-dot chain line in "HYDRAULIC PRESSURE COMMAND VALUE" in FIG. 8) is rapidly reduced at the point t1 of time and thereafter, and a command value of the engaging hydraulic pressure PRcb of the engaging coupling device (see solid line in "HYDRAULIC PRESSURE COMMAND VALUE" in FIG. 8) is slowly increased (see part A in FIG. 8) so that the shift-up action of the step-variable transmission portion 20 is progressed with the command value of the engaging hydraulic pressure PRcb of the engaging coupling device being set to be relatively low (see particularly a period t2-t3 of time in FIG. 8 corresponding to an inertia phase period). In this instance, a high priority is given to a control to make the target value of the engine angular acceleration dωe/dt substantially zero (see part B in FIG. 8), so that the shift-up action is progressed with the engine rotating speed ωe being restrained from being fluctuated (see part C in FIG. 8). In other words, the target value of the engine angular acceleration dωe/dt is controlled such that the engine rotating speed ωe is held substantially constant at zero with a high priority. Since the engaging hydraulic pressure PRcb of the engaging coupling device is controlled to be relatively low in process of the shift-up action of the step-variable transmission portion 20, the control to reduce the command value of the engaging hydraulic pressure PRcb of the engaging coupling device at a final stage of the shift-up action, is not executed (see part D in FIG. 8). After the inertia phase has been terminated, the command value of the engaging hydraulic pressure PRcb of the engaging coupling device is increased to a value that causes the engaging coupling device to be engaged completely (see point t4 of time in FIG. 8). When the engine 14 is operated for the catalyst warming-up, too, the shifting of the transmission device 40 is controlled substantially in the same manner as when the engine 14 is stopped. However, during the operation of the engine 14 for the catalyst warming-up, the engine rotating speed ωe is held substantially at a constant value in the form of the predetermined value for facilitating the catalyst warming-up.

Figure 9:
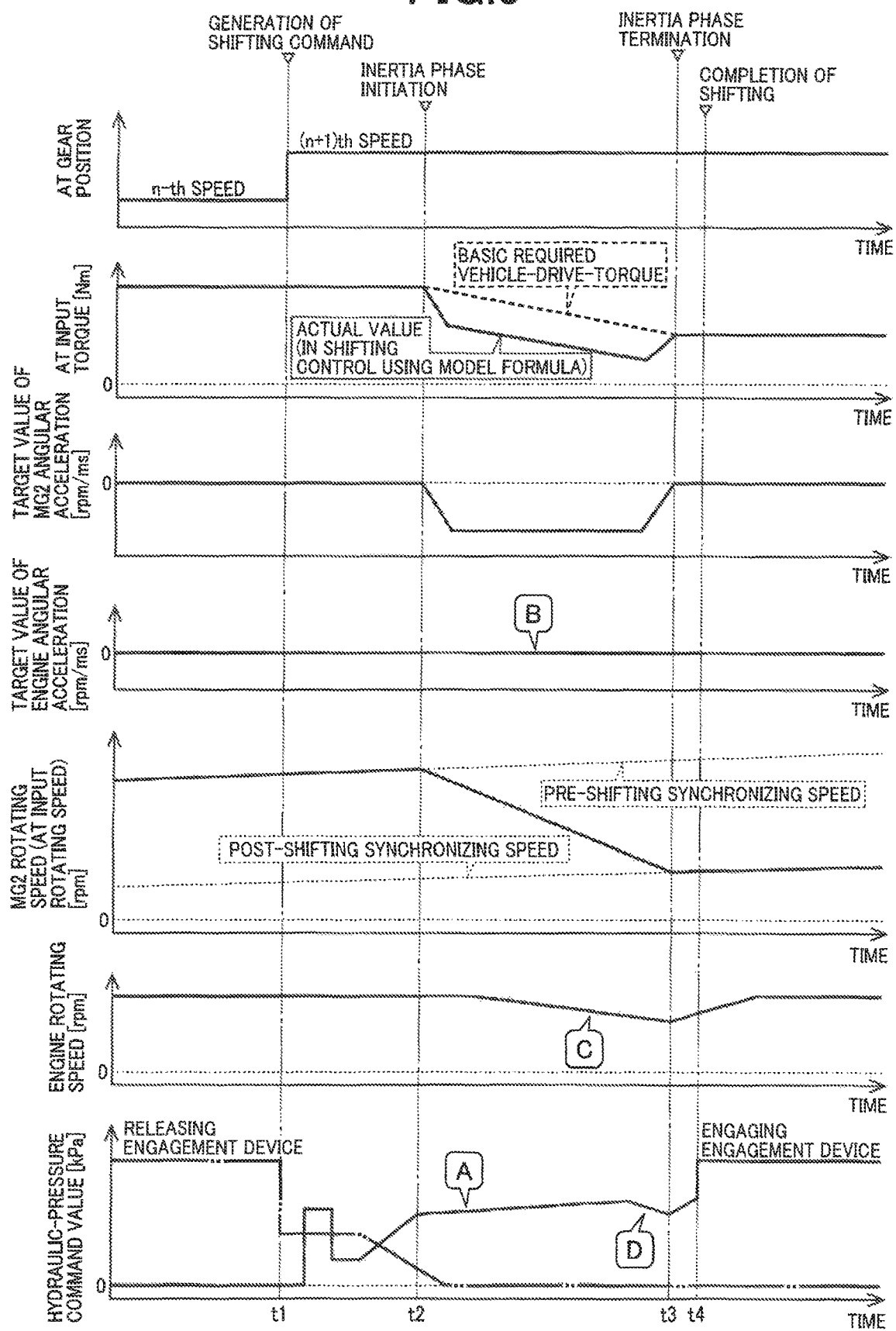
FIG. 9 is an example of a time chart where the control routine illustrated by the flow chart of FIG. 7 is executed upon execution of a shifting of the transmission device, which is accompanied by a shift-up action of the step-variable transmission portion, during stop of the engine, wherein the shifting is executed by a non-overall shifting control.

FIG. 9 is an example of a time chart where the control routine illustrated by the flow chart of FIG. 7 is executed upon execution of a shifting of the transmission device 40, which is accompanied by a shift-up action of the step-variable transmission portion 20, during the normal operation state of the engine 14, wherein the shifting is executed by the non-overall shifting control. In FIG. 9, a point t1 of time indicates a point of time at which output of command requesting execution of a shift-up action (n→n+1) is initiated. When the output of the shift-up command is initiated, a command value of the engaging hydraulic pressure PRcb of the releasing coupling device (see two-dot chain line in "HYDRAULIC PRESSURE COMMAND VALUE" in FIG. 9) is rapidly reduced at the point t1 of time and thereafter, and a command value of the engaging hydraulic pressure PRcb of the engaging coupling device (see solid line in "HYDRAULIC PRESSURE COMMAND VALUE" in FIG. 9) is rapidly increased (see part A in FIG. 8) so as to assure a high degree of responsiveness of the engaging coupling device, so that the shift-up action of the step-variable transmission portion 20 is progressed with the command value of the engaging hydraulic pressure PRcb of the engaging coupling device being set to be relatively high (see particularly a period t2-t3 of time in FIG. 9 corresponding to an inertia phase period). In this instance, although the target value of the engine angular acceleration dωe/dt is set to a certain value (see part B in FIG. 9), the shift-up action is progressed with the engine rotating speed ωe being allowed to be fluctuated by a certain degree (see part C in FIG. 9) because a high priority is not given to restraint of fluctuation of the engine rotating speed ωe. Since the engaging hydraulic pressure PRcb of the engaging coupling device is controlled to be relatively high in process of the shift-up action of the step-variable transmission portion 20, the control to temporarily reduce the command value of the engaging hydraulic pressure PRcb of the engaging coupling device at a final stage of the shift-up action, is executed (see part D in FIG. 8) for reducing the engaging shock. After the inertia phase has been terminated, the command value of the engaging hydraulic pressure PRcb of the engaging coupling device is increased to a value that causes the engaging coupling device to be engaged completely (see point t4 of time in FIG. 8). It is noted that, when the shifting of the transmission device 40 is executed by the overall shifting control, too, the shifting of the transmission device 40 is controlled substantially in the same manner as when the shifting of the transmission device 40 is executed by the non-overall shifting control, as described above. However, in the overall shifting control, the engine rotating speed ωe is reduced with the shift-up action.

As described above, in the present embodiment, the engaging hydraulic pressure PRcb of the engaging coupling device, which is to be placed in the engaged state upon completion of the shifting action, is controlled in process of the shifting action, such that the engaging hydraulic pressure PRcb of the engaging coupling device is controlled to be lower when the engine 14 is in the second operational state, than the engine 14 is in the first operational state, so that the engine rotating speed ωe is less likely to be deviated from the target value when the engine 14 is in the second operational state. That is, even if the engaging pressure varies in terms of the responsiveness or followability due to individual variation of the step-variable transmission portion 20, the engine rotating speed ωe is less likely to be deviated from the target value in the process of a shifting action of the step-variable transmission portion 20, without much influence by the individual variation, owing to the arrangement in which the shifting action is progressed with the engaging hydraulic pressure PRcb of the engaging coupling device being controlled to be relatively low Thus, the engine rotating speed ωe can be accurately controlled in the process of the shifting action of the step-variable transmission portion 20 when the engine 14 is in the second operational statet. Therefore, it is possible to reduce shock upon restart of the engine 14, and/or to cause the catalyst warming-up to be adequately performed. Further, the shifting action can be rapidly progressed with the engaging hydraulic pressure PRcb of the engaging coupling device being controlled to be relatively high. Thus, it is possible to reduce the time required to complete the shifting action in the process of the shifting action of the step-variable transmission portion 20 when the engine 14 is in the first operational state corresponding to the normal operation state. Therefore, the accuracy of control of the engine rotating speed ωe and the drivability can be both improved, depending on the operational state of the engine 14.

Further, in the present embodiment, when the engine 14 is in the first operational state corresponding to the normal operation state, the engaging hydraulic pressure PRcb of the engaging coupling device, which has been increased, is temporarily reduced before the completion of the shifting action. Thus, although the engaging hydraulic pressure PRcb of the engaging coupling device is controlled to be relatively high when the engine 14 is in the first operational state, the engaging shock can be reduced by the temporal reduction of the engaging hydraulic pressure PRcb.

Further, in the present embodiment, when the engine 14 is in the second operational state corresponding to the engine stop state and/or the catalyst warming-up state, the target value of the engine angular acceleration dωe/dt is set to a value that causes the engine rotating speed ωe to be held at a substantially constant value in the process of the shifting action. With the engine rotating speed ωe being held substantially constant, it is possible to reduce shock upon restart of the engine 14, and/or to cause the catalyst warming-up to be adequately performed.

Further, in the present embodiment, when the engine 14 is in the second operational state, the target value of the engine angular acceleration dωe/dt is compensated such that the engine rotating speed ωe is not made lower than the substantially constant value in the process of the shifting action, so that, even if the engine rotating speed ωe is fluctuated, the engine rotating speed ωe is not made lower than the target value. Thus, when the engine 14 is stopped, the engine 14 is avoided from being rotated in a negative direction. Further, when the engine 14 is operated to warm up the catalyst, the catalyst warming-up can be adequately continued.

Further, in the present embodiment, when the power-on shift-up action of the step-variable transmission portion 20 is executed, it is possible to improve accuracy of control of the engine rotating speed ωe and also improve drivability of the vehicle 10, depending on an operational state of the engine 14.

There will be described another embodiment of this invention. The same reference signs as used in the above-described embodiment will be used in the following embodiment, to identify the functionally corresponding elements, and descriptions thereof are not provided.

Second Embodiment

Figure 10:
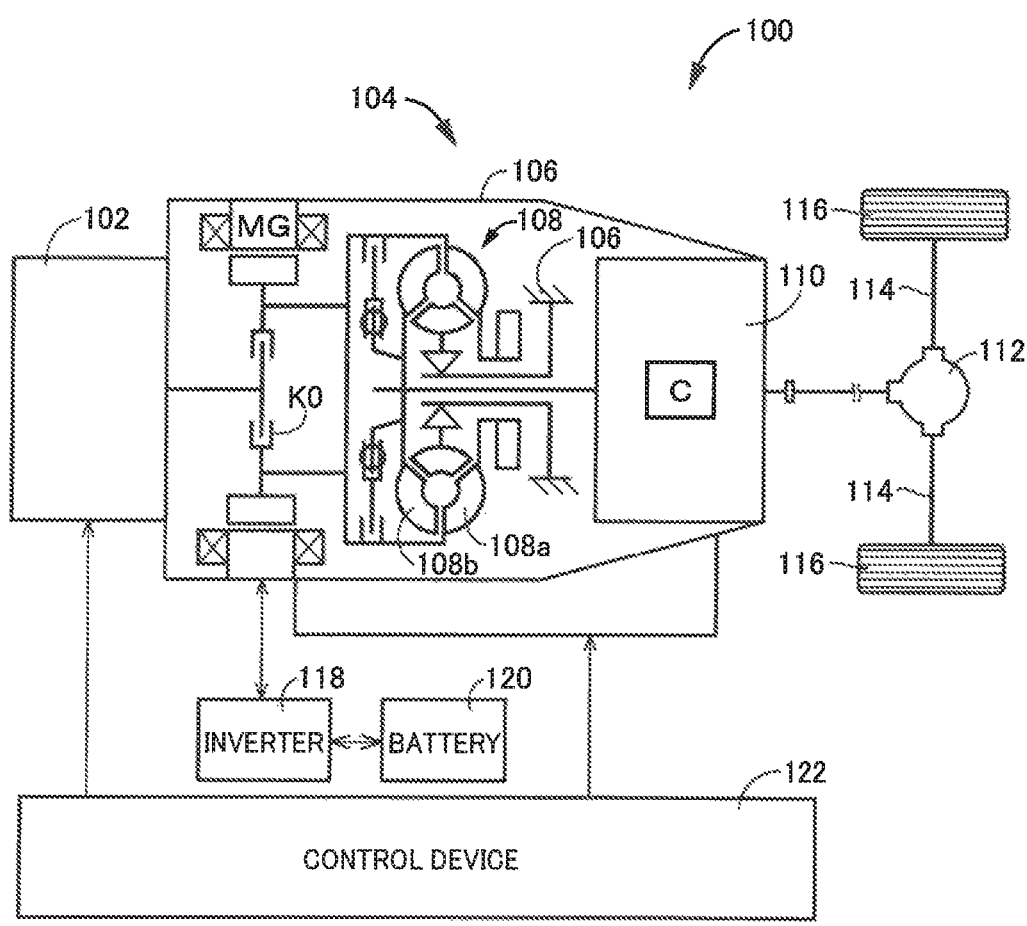
FIG. 10 is a schematic view showing an arrangement of a power transmitting system of a vehicle (that is different from the vehicle shown in FIG. 1) to be controlled by a control apparatus according to the present invention.

In this second embodiment, the control apparatus according to the invention is used for controlling a vehicle 100 shown in FIG. 10, which is different from the vehicle 10 in the first embodiment in which the continuously variable transmission portion 18 and the step-variable transmission portion 20 are connected in series with each other.

As shown in FIG. 10, the vehicle 100 is a hybrid vehicle including an engine 102 serving as a drive power source, a motor/generator (rotating machine) MG also serving as the drive power source, and a power transmitting system 104. The power transmitting system 104 includes a clutch K0, a torque converter 108, and an automatic transmission 110, which are disposed within a non-rotatable member in the form of a casing 106 fixed to a body of the vehicle 100, in this order of description as seen in the direction away from the engine 102. The power transmitting system 104 further includes a differential gear device 112 and axles 114. The torque converter 108 has a pump impeller 108a selectively connected to the engine 102 through the clutch K0 and directly connected to the motor/generator MG, and a turbine impeller 108b directly connected to the automatic transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the torque converter 108, the automatic transmission 110, the differential gear device 112 and the axles 114, in this order of description. The automatic transmission 110 is a mechanically-operated transmission mechanism which constitutes a part of a power transmitting path between the drive power source (that is constituted by the engine 102 and the motor/generator MG) and the drive wheels 116, and is a known automatic transmission of a planetary gear type which is configured to establish a selected one of a plurality of gear positions by engagement of at least one of a plurality of coupling devices C, as the step-variable transmission portion 20 in the above-described first embodiment. The vehicle 100 further includes an inverter 118, and an electric power storage device in the form of a battery 120 to and from which an electric power is respectively supplied from and to the motor/generator MG through the inverter 118, as well as a control device 122.

The control device 122 has the functions of the transmission shifting control portion 82, hybrid control portion 84, torque control portion 86 and state determining portion 88, which are incorporated in the electronic control device 80 according to the above-described first embodiment.

The control device 122 is configured to selectively establish a motor drive mode in which the vehicle 100 is driven with only the motor/generator MG operated as the drive power source with electric power supplied from the battery 120 while the engine 102 is stopped (held at rest), in the released state of the clutch K0, or a hybrid drive mode in which the vehicle 100 is driven with the engine 102 operated as the drive power source, in the engaged state of the clutch K0. In the hybrid drive mode established by the control device 122, a drive torque generated by the motor/generator MG with the electric power supplied from the battery 120 may be added to the drive force generated by the engine 102, or the motor/generator MG may be operated as an electric generator with the drive force of the engine 102, so that the battery 120 is charged with the electric power generated by the motor/generator MG. Thus, the motor/generator MG is an electrically-operated rotating device having a function of an electric motor and a function of an electric generator. An output torque (vehicle driving torque or regenerative torque) of the motor/generator MG is controlled by the inverter 118 under the control of the control device 122.

The control device 122 is configured, during a shifting action of the automatic transmission 110, to implement a feedback control to control an input torque inputted to the automatic transmission 110, on the basis of a transmitted torque transmitted through the automatic transmission 110, such that a value representing a rotational state of the engine 102 coincides with a target value.

Like the electronic control device 80, when a shifting action of the automatic transmission 110 is executed, the control device 122 is capable of implementing a control for assuring the improvement of accuracy of control of the engine rotating speed ωe and the improvement of the drivability, depending on the operational state of the engine 102.

The present second embodiment has the same advantages as the first embodiment described above.

While the preferred embodiments of this invention have been described in detail by reference to the drawings, it is to be understood that the invention may be otherwise embodied.

For example, in the above-described first embodiment, in the shifting control using the above-described mathematical equation (1), the MG2 angular acceleration dωm/dt is used as an example of the value representing the rotational state of the input rotary member of the step-variable transmission portion 20, and the engine angular acceleration dωe/dt is used as an example of the value representing the rotational state of the engine 14. However, the value representing the rotational state of each of the input rotary member of the step-variable transmission portion 20 and the engine 14 may be, for example, the rotating speed of a corresponding one of the input rotary member and the engine 14. In this case in which the rotating speed is to be controlled to a target value, in the shifting control using the mathematical equation (1), the AT input torque Ti may be compensated through known PI control in which a feedback control amount is calculated based on a deviation of an actual value of the rotating speed from the target value of the rotating speed.

In the above-described first embodiment, the vehicle 10 is provided with the differential mechanism 32 in the form of a planetary gear set of a single-pinion type, and the continuously-variable transmission portion 18 serving as an electrically-controlled transmission mechanism. However, the continuously-variable transmission portion 18 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 14, and a pair of bevel gears which mesh with the pinion and to which the first motor/generator MG1 and the intermediate power-transmitting member 30 are respectively connected. Further, the differential mechanism 32 may be replaced by a mechanism which includes two or more planetary gear sets rotary elements of which are connected to each other and/or operatively connected to the engine, motor/generator and drive wheels, in a power transmittable manner.

In the above-described second embodiment, the vehicle 100 may be a vehicle not including the clutch K0. The present invention is applicable to any vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle. While the vehicle 100 uses the torque converter 108 as a fluid-operated power transmitting device, the vehicle 100 may use other types of fluid-operated power transmitting devices such as a fluid coupling, which do not have a torque boosting function. Further, the torque converter 108 need not be provided, or may be replaced by a device having a simple clutch function.

In each of the above-described embodiments, the mechanically-operated transmission mechanism (in the form of the step-variable transmission portion 20 or automatic transmission 110), which constitutes a part of the power transmitting path between the drive power source and the drive wheels, may be any step-variable transmission configured to establish each of a plurality of gear positions by engagement of at least one of a plurality of coupling devices. That is, the step-variable transmission may be, for example, a planetary-gear-type automatic transmission such as the above-described step-variable transmission portion 20, or any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices each connecting to respective inputs of the two shifting units correspond to ones of the plurality of coupling devices, by engagement of which each of the plurality of gear positions is established.

In the above-described first embodiment, the ten overall speed positions are established for the four AT gear appositions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power-transmitting member 30 and the rotating speed of the second motor/generator MG2 connected to the intermediate power-transmitting member 30 are held within respective predetermined ranges, and the transmission device 40 is shifted such that the engine rotating speed ωe is held within a predetermined range.

In the above-described first embodiment, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

It is to be understood that the embodiments described above are given for illustrative purpose only, and that the present invention may be embodied with various modifications and improvements which may occur to those skilled in the art.

NOMENCLATURE OF ELEMENTS

10: vehicle
14: engine (drive power source)
18: electrically-controlled continuously-variable transmission portion
  (electrically-controlled transmission mechanism)
20: mechanically-operated step-variable transmission portion
  (mechanically-operated transmission mechanism)
28: drive wheels
30: intermediate power-transmitting member
  (output rotary member of electrically-controlled transmission mechanism, input rotary member of mechanically-operated transmission mechanism)
32: differential mechanism
80: electronic control device (control apparatus)
82: AT shift control portion (shift control portion)
86: torque control portion
88: state determining portion
CB: coupling devices
MG1: first motor/generator
MG2: second motor/generator (drive power source, motor/generator)
100: vehicle
102: engine (drive power source)
110: automatic transmission (mechanically-operated transmission mechanism)
116: drive wheels
122: control device
C: coupling devices
MG: motor/generator (drive power source)

What is claimed is:

1. A control apparatus for a vehicle that includes (i) an engine serving as a drive power source, (ii) a motor/generator serving as the drive power source, and (iii) a mechanically-operated transmission mechanism which constitutes a part of a power transmitting path between the drive power source and drive wheels of the vehicle and which is placed in a selected one of a plurality of gear positions with engagement of a selected one or ones of a plurality of coupling devices included in the mechanically-operated transmission mechanism, wherein the engine is provided with a catalyst, the control apparatus comprising:
  a torque control portion configured, when a shifting action of the mechanically-operated transmission mechanism is executed, to control an input torque inputted to the mechanically-operated transmission mechanism, on the basis of a transmitted torque transmitted through the mechanically-operated transmission mechanism, such that a value representing a rotational state of the engine coincides with a target value;
  a state determining portion configured to determine whether the engine is in a first operational state or a second operational state, the first operational state corresponding to a normal operation state in which the engine is operated without purpose of warming up the catalyst, the second operational state corresponding to: (a) an engine stop state in which the engine is stopped, or (b) a catalyst warming-up state in which the engine is operated to warm up the catalyst; and
  a shift control portion configured, in process of the shifting action, to control at least an engaging pressure of an engaging coupling device as one of the plurality of coupling devices which is to be placed in an engaged state upon completion of the shifting action, such that the engaging pressure of the engaging coupling device is controlled to be lower when it is determined by the state determining portion that the engine is in the second operational state, than when it is determined by the state determining portion that the engine is in the first operational state.

2. The control apparatus according to claim 1, wherein the shift control portion is configured, when the engine is in the first operational state, to increase the engaging pressure of the engaging coupling device and then temporarily reduce the engaging pressure of the engaging coupling device before the completion of the shifting action.

3. The control apparatus according to claim 1, wherein the torque control portion is configured, when the engine is in the second operational state, to set the target value of the value representing the rotational state of the engine, to a value that causes a rotating speed of the engine to be held at a substantially constant value in the process of the shifting action.

4. The control apparatus according to claim 3, wherein the torque control portion is configured, when the engine is in the second operational state, to compensate the target value of the value representing the rotational state of the engine, such that the rotating speed of the engine is not made lower than the substantially constant value in the process of the shifting action.

5. The control apparatus according to claim 1, wherein the shifting action of the mechanically-operated transmission mechanism is a power-on shift-up action that is a shift-up action to be executed with an acceleration operation member of the vehicle being placed in an operated position.

6. The control apparatus according to claim 1, wherein
  the vehicle includes an electrically-controlled transmission mechanism including a differential mechanism to which the engine is connected in a power transmittable manner, and a first motor/generator connected to the differential mechanism in a power transmittable manner, such that a differential state of the differential mechanism is controlled with an operating state of the first motor/generator being controlled,
  the motor/generator serving as the drive power source is a second motor/generator that is connected to an output rotary member of the electrically-controlled transmission mechanism in a power transmittable manner, and
  the torque control portion is configured, when the shifting action of the mechanically-operated transmission mechanism is executed, to control an output torque of the first motor/generator and an output torque of the second motor/generator, on the basis of an output torque of the engine and the transmitted torque transmitted through the mechanically-operated transmission mechanism, such that a value representing a rotational state of an input rotary member of the mechanically-operated transmission mechanism and the value representing the rotational state of the engine coincides with respective target values.

7. The control apparatus according to claim 1, wherein
  the second operational state corresponds to at least the engine stop state, and
  when the engine is in the first operational state that corresponds to the normal operation state, the engine is operated while a temperature of the catalyst is not lower than a predetermined value.

8. The control apparatus according to claim 1, wherein the second operational state corresponds to at least the catalyst warming-up state,
when the engine is in the first operational state that corresponds to the normal operation state, the engine is operated while a temperature of the catalyst is not lower than a predetermined value, and
when the engine is in the second operational state, the engine is operated while the temperature of the catalyst is lower than the predetermined value.

9. A control apparatus for a vehicle that includes (i) an engine serving as a drive power source, (ii) a motor/generator serving as the drive power source, and (iii) a mechanically-operated transmission mechanism which constitutes a part of a power transmitting path between the drive power source and drive wheels of the vehicle and which is placed in a selected one of a plurality of gear positions with engagement of a selected one or ones of a plurality of coupling devices included in the mechanically-operated transmission mechanism, wherein the engine is provided with a catalyst, the control apparatus comprising:
a processor programmed to:
when a shifting action of the mechanically-operated transmission mechanism is executed, control an input torque inputted to the mechanically-operated transmission mechanism, on the basis of a transmitted torque transmitted through the mechanically-operated transmission mechanism, such that a value representing a rotational state of the engine coincides with a target value;
determine whether the engine is in a first operational state or a second operational state, the first operational state corresponding to a normal operation state in which the engine is operated without purpose of warming up the catalyst, the second operational state corresponding to: (a) an engine stop state in which the engine is stopped, or (b) a catalyst warming-up state in which the engine is operated to warm up the catalyst; and
in process of the shifting action, control at least an engaging pressure of an engaging coupling device as one of the plurality of coupling devices which is to be placed in an engaged state upon completion of the shifting action, such that the engaging pressure of the engaging coupling device is controlled to be lower when the engine is determined as being in the second operational state, than when the engine is determined as being in the first operational state.

10. The control apparatus according to claim 9, wherein when the engine is in the first operational state, the processor is programmed to increase the engaging pressure of the engaging coupling device and then temporarily reduce the engaging pressure of the engaging coupling device before the completion of the shifting action.

11. The control apparatus according to claim 9, wherein when the engine is in the second operational state, the processor is programmed to set the target value of the value representing the rotational state of the engine, to a value that causes a rotating speed of the engine to be held at a substantially constant value in the process of the shifting action.

12. The control apparatus according to claim 11, wherein when the engine is in the second operational state, the processor is programmed to compensate the target value of the value representing the rotational state of the engine, such that the rotating speed of the engine is not made lower than the substantially constant value in the process of the shifting action.

13. The control apparatus according to claim 9, wherein the shifting action of the mechanically-operated transmission mechanism is a power-on shift-up action that is a shift-up action to be executed with an acceleration operation member of the vehicle being placed in an operated position.

14. The control apparatus according to claim 9, wherein the vehicle includes an electrically-controlled transmission mechanism including a differential mechanism to which the engine is connected in a power transmittable manner, and a first motor/generator connected to the differential mechanism in a power transmittable manner, such that a differential state of the differential mechanism is controlled with an operating state of the first motor/generator being controlled,
the motor/generator serving as the drive power source is a second motor/generator that is connected to an output rotary member of the electrically-controlled transmission mechanism in a power transmittable manner, and
when the shifting action of the mechanically-operated transmission mechanism is executed, the processor is programmed to control an output torque of the first motor/generator and an output torque of the second motor/generator, on the basis of an output torque of the engine and the transmitted torque transmitted through the mechanically-operated transmission mechanism, such that a value representing a rotational state of an input rotary member of the mechanically-operated transmission mechanism and the value representing the rotational state of the engine coincides with respective target values.

15. The control apparatus according to claim 9, wherein the second operational state corresponds to at least the engine stop state, and
when the engine is in the first operational state that corresponds to the normal operation state, the engine is operated while a temperature of the catalyst is not lower than a predetermined value.

16. The control apparatus according to claim 9, wherein the second operational state corresponds to at least the catalyst warming-up state,
when the engine is in the first operational state that corresponds to the normal operation state, the engine is operated while a temperature of the catalyst is not lower than a predetermined value, and
when the engine is in the second operational state, the engine is operated while the temperature of the catalyst is lower than the predetermined value.

\* \* \* \* \*